(12) United States Patent
Lee et al.

(10) Patent No.: US 6,648,769 B2
(45) Date of Patent: Nov. 18, 2003

(54) INSTRUMENTED GOLF CLUB SYSTEM & METHOD OF USE

(75) Inventors: Nathan J. Lee, Escondido, CA (US); J. Andrew Galloway, Carlsbad, CA (US); William Kelly Borsum, Escondido, CA (US)

(73) Assignee: Callaway Golf Company, Carlsbad, CA (US)

( * ) Notice: Subject to any disclaimer, the term of this patent is extended or adjusted under 35 U.S.C. 154(b) by 360 days.

(21) Appl. No.: 09/846,504

(22) Filed: Apr. 30, 2001

(65) Prior Publication Data

US 2001/0053720 A1 Dec. 20, 2001

Related U.S. Application Data

(63) Continuation-in-part of application No. 09/310,835, filed on May 12, 1999, now Pat. No. 6,224,493.

(51) Int. Cl.[7] ............................................... A63B 57/00
(52) U.S. Cl. ...................... 473/223; 473/407; 473/232; 473/233; 473/221
(58) Field of Search .................. 473/219, 221, 473/222, 223, 225, 226, 231, 232, 233, 239, 256, 257, 258, 288, 289, 290, 307, 334, 407, 409; 463/3

(56) References Cited

U.S. PATENT DOCUMENTS

| 1,876,657 | A |   | 9/1932  | Fox |
|-----------|---|---|---------|-----|
| 3,182,508 | A |   | 5/1965  | Varju |
| 3,270,564 | A |   | 9/1966  | Evans |
| 3,717,875 | A |   | 2/1973  | Evans |
| 3,788,647 | A |   | 1/1974  | Evans |
| 3,792,863 | A |   | 2/1974  | Evans |
| 3,806,131 | A |   | 4/1974  | Evans |
| 3,945,646 | A | * | 3/1976  | Hammond ................. 473/223 |
| 4,088,324 | A |   | 5/1978  | Farmer |
| 4,136,387 | A |   | 1/1979  | Sullivan et al. |
| 4,759,219 | A |   | 7/1988  | Cobb et al. |
| 4,789,160 | A |   | 12/1988 | Dollar, Jr. et al. |
| 4,822,042 | A |   | 4/1989  | Landsman |
| 4,830,377 | A |   | 5/1989  | Kobayashi |
| 4,834,376 | A |   | 5/1989  | Steinberg |
| 4,870,868 | A |   | 10/1989 | Gastgeb et al. |
| 4,898,389 | A |   | 2/1990  | Plutt |
| 4,930,787 | A |   | 6/1990  | Nobles, Jr. |
| 4,940,236 | A |   | 7/1990  | Allen |
| 4,991,850 | A | * | 2/1991  | Wilhlem ................. 473/233 |
| 5,031,909 | A |   | 7/1991  | Pecker |
| 5,111,410 | A |   | 5/1992  | Nakayama et al. |
| 5,131,660 | A |   | 7/1992  | Marocco |
| 5,184,826 | A |   | 2/1993  | Hall, Jr. |
| 5,209,483 | A |   | 5/1993  | Gedney et al. |
| 5,221,088 | A |   | 6/1993  | McTeigue et al. |
| 5,233,544 | A | * | 8/1993  | Kobayashi ................. 702/141 |
| 5,332,225 | A |   | 7/1994  | Ura |
| 5,395,116 | A |   | 3/1995  | Blaakman |
| 5,419,563 | A |   | 5/1995  | Abrams et al. |
| 5,435,561 | A |   | 7/1995  | Conley |
| 5,441,269 | A |   | 8/1995  | Henwood |

(List continued on next page.)

*Primary Examiner*—Michael O'Neill
*Assistant Examiner*—Julie Brochetti
(74) *Attorney, Agent, or Firm*—Michael A. Catania; Elaine H. Lo

(57) ABSTRACT

An instrumented golf club system having an instrumented golf club, an interface means and a computing means is disclosed herein. The instrumented golf club includes a plurality of sensors, an internal power supply, an angular rate sensor and an internal ring buffer memory for capturing data relating to a golf swing. The interface means is capable of transferring data from the instrumented golf club to the computing means for processing the data and presenting the data in a useful and informative format. The data may be used to assist a golfer's swing, or to design an appropriate golf club for a specific type of golfer.

5 Claims, 14 Drawing Sheets

U.S. PATENT DOCUMENTS

| | | |
|---|---|---|
| 5,472,205 A | 12/1995 | Bouton |
| 5,474,298 A | 12/1995 | Lindsay |
| 5,492,329 A | 2/1996 | Kronin |
| 5,616,832 A | 4/1997 | Nauck |
| 5,623,459 A * | 4/1997 | Iwamura et al. ............ 369/126 |
| 5,638,300 A | 6/1997 | Johnson |
| 5,688,183 A | 11/1997 | Sabatino et al. |
| 5,694,340 A | 12/1997 | Kim |
| 5,707,298 A | 1/1998 | Chovanes |
| 5,709,610 A | 1/1998 | Ognjanovic |
| 5,779,555 A * | 7/1998 | Nomura et al. ............. 473/223 |
| 5,792,000 A | 8/1998 | Weber et al. |
| 5,792,001 A | 8/1998 | Henwood |

\* cited by examiner

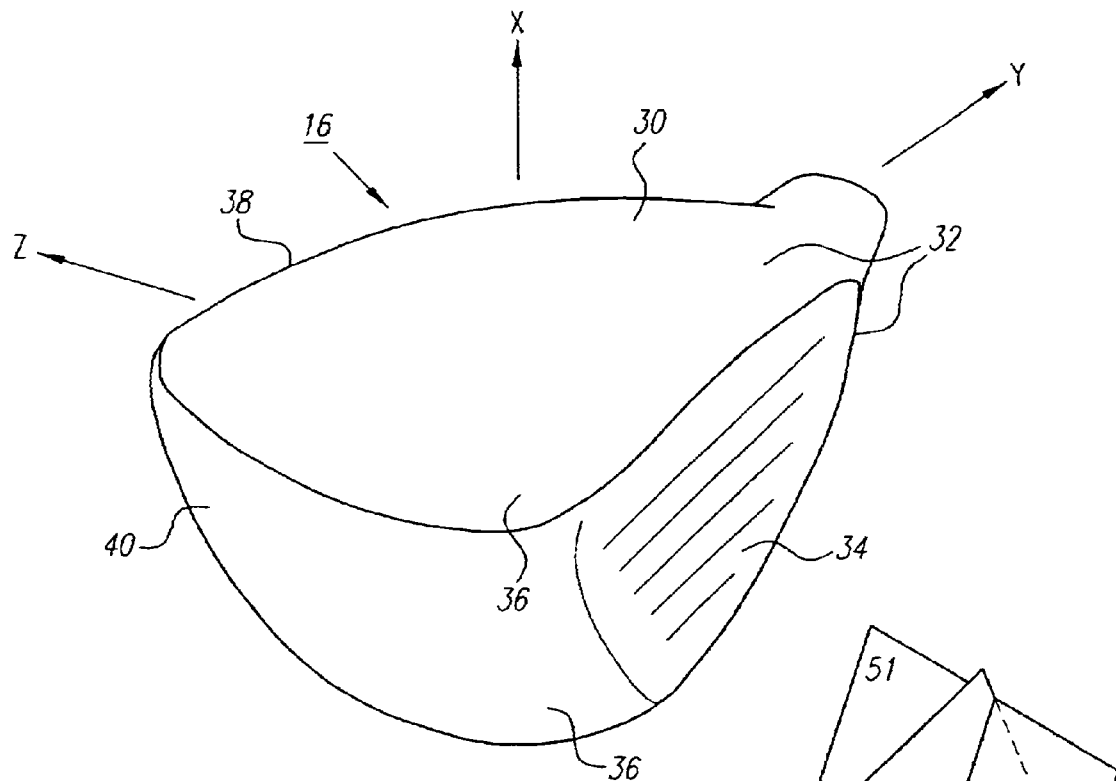
FIG. 2
FIG. 2A
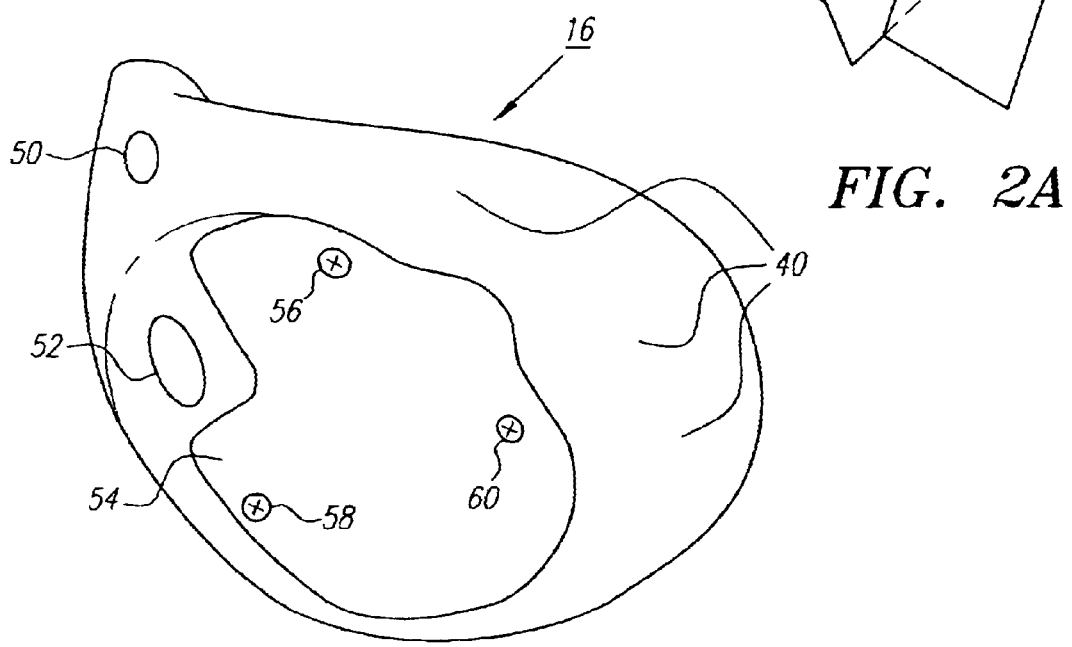
FIG. 3

|  |  | 326 | 328 | 330 | 332 | 334 | 336 | 338 | 340 |
|---|---|---|---|---|---|---|---|---|---|
| DATA DOW ######## | | | | | | | | | |
| 320—SLOPE: | | 0.25 | 0.25 | 0.25 | 0.25 | -2.4903 | -2.4809 | -14.8241 | 1.718 |
| 322—OFFSET: | | 3 | 8.25 | 1.25 | -1.5 | -22.41 | -7.44 | 237.19 | -1702.54 |
| 324—ZERO COUNT | | -12 | -33 | -5 | 6 | -9 | -3 | 16 | 991 |

| SWING | SCAN | 400 Z ACCEL HEEL | 402 X ACCEL | 404 Y ACCEL | 406 Z ACCEL TOE | 408 BUTT ID | 410 BUTT BEND | 382 TIP BEND | 412 ANG. RATE |
|---|---|---|---|---|---|---|---|---|---|
| 0 | 1 | -0.3 | 6.5 | -0.8 | -0.3 | 82.2 | -9.9 | 0 | -20.6 |
| 0 | 2 | -0.3 | 7.8 | -0.8 | -1 | 84.7 | -9.9 | 0 | -18.9 |
| 0 | 3 | -0.3 | 5.5 | 0 | 0 | 82.2 | -9.9 | 0 | -20.6 |
| 0 | 4 | -0.3 | 6.5 | 0.3 | 1.3 | 82.2 | -9.9 | 0 | -20.6 |
| 0 | 5 | -0.3 | 6.3 | 0.5 | 0 | 84.7 | -9.9 | 0 | -20.6 |
| 0 | 6 | -0.3 | 8 | -2 | 0 | 84.7 | -9.9 | 0 | -20.6 |
| 0 | 7 | -0.5 | 5 | 0.3 | 0.8 | 84.7 | -9.9 | 0 | -20.6 |
| 0 | 8 | -0.3 | 6.3 | -2.3 | 0.8 | 84.7 | -9.9 | 0 | -20.6 |
| 0 | 9 | -0.3 | 7.8 | 0.5 | 0 | 84.7 | -9.9 | 0 | -20.6 |
| 0 | 10 | -0.3 | 5 | -0.8 | 1 | 84.7 | -12.4 | 0 | -20.6 |
| 0 | 11 | -0.3 | 6.5 | -0.8 | 1.3 | 84.7 | -9.9 | 0 | -20.6 |
| 0 | 12 | -0.3 | 6 | -2.3 | -0.3 | 84.7 | -9.9 | 0 | -20.6 |
| 0 | 13 | -0.8 | 6.3 | 0.3 | 0.5 | 84.7 | -9.9 | 0 | -20.6 |
| 0 | 14 | -0.3 | 7.3 | -1 | -1 | 84.7 | -9.9 | 0 | -20.6 |
| 0 | 15 | -0.8 | 6.5 | -2.3 | -0.8 | 84.7 | -9.9 | 0 | -20.6 |
| 0 | 16 | -0.5 | 7.5 | -0.8 | 0 | 84.7 | -9.9 | 0 | -20.6 |
| 0 | 17 | -0.8 | 7.8 | 0.5 | 0 | 84.7 | -9.9 | 0 | -20.6 |
| 0 | 18 | -0.8 | 6 | 0.3 | -1.3 | 84.7 | -9.9 | 0 | -20.6 |
| 0 | 19 | 1.3 | 7.8 | -0.8 | -0.5 | 87.2 | -9.9 | 0 | -20.6 |
| 0 | 20 | -0.3 | 7.5 | 0.5 | 0 | 84.7 | -9.9 | 0 | -20.6 |
| 0 | 21 | -0.3 | 6 | 0 | 1 | 84.7 | -9.9 | 0 | -20.6 |
| 0 | 22 | -1 | 7.8 | -0.8 | -1 | 84.7 | -9.9 | 0 | -20.6 |
| 0 | 23 | -0.3 | 6.3 | -2 | 0 | 84.7 | -9.9 | 0 | -20.6 |
| 0 | 24 | -1.5 | 6.5 | -1.8 | 1.3 | 84.7 | -9.9 | 0 | -20.6 |
| 0 | 25 | -1.3 | 5 | -1 | 0 | 84.7 | -9.9 | 0 | -20.6 |
| 0 | 26 | -0.3 | 5 | 0.5 | -1.3 | 84.7 | -9.9 | 0 | -20.6 |
| 0 | 27 | -0.3 | 6.5 | 0.5 | -0.3 | 84.7 | -9.9 | 0 | -20.6 |
| 0 | 28 | -0.3 | 5.8 | -0.5 | 0 | 84.7 | -7.4 | 0 | -20.6 |
| 0 | 29 | -0.5 | 6.5 | -0.8 | 0 | 84.7 | -9.9 | 0 | -20.6 |
| 0 | 30 | -0.3 | 6.5 | 0.5 | 0 | 84.7 | -9.9 | 0 | -20.6 |
| 0 | 31 | -0.3 | 6.5 | 0.5 | -0.3 | 84.7 | -9.9 | 0 | -22.3 |
| 0 | 32 | -0.5 | 6.5 | -0.8 | 0.8 | 84.7 | -9.9 | 0 | -22.3 |
| 0 | 33 | -0.5 | 6.5 | -1 | 1 | 84.7 | -9.9 | 0 | -22.3 |
| 0 | 34 | -0.3 | 5 | 0.5 | 0 | 84.7 | -9.9 | 0 | -22.3 |
| 344 | 346 | 376 | 372 | 374 | 370 | 378 | 380 | 382 | 384 |

*FIG. 10*

| SWING | SCAN | 400 Z ACCEL HEEL | 402 X ACCEL | 404 Y ACCEL | 406 Z ACCEL TOE | 408 BUTT TD | 410 BUTT BEND | 382 TIP BEND | 412 ANG. RATE |
|---|---|---|---|---|---|---|---|---|---|
| 0 | 1460 | -10.8 | -46.8 | 33 | -13.8 | -577.7 | -836.1 | -370.6 | -158.1 |
| 0 | 1461 | -10.8 | -48 | 34.5 | -15 | -540.4 | -831.1 | -385.4 | -164.9 |
| 0 | 1462 | -10.8 | -48.3 | 35.3 | -15.3 | -500.5 | -823.7 | -400.3 | -173.5 |
| 0 | 1463 | -11.3 | -50.8 | 35 | -16 | -458.2 | -813.7 | -415.1 | -182.1 |
| 0 | 1464 | -11 | -52.3 | 35.5 | -15.8 | -415.9 | -803.8 | -429.9 | -190.7 |
| 0 | 1465 | -10 | -55 | 36.5 | -16.3 | -371 | -791.4 | -444.7 | -201 |
| 0 | 1466 | -10.3 | -56.8 | 38.5 | -16 | -323.7 | -779 | -459.5 | -209.6 |
| 0 | 1467 | -11.5 | -57.5 | 38.3 | -17.8 | -276.4 | -764.1 | -474.4 | -218.2 |
| 0 | 1468 | -11.8 | -60 | 39.5 | -16.8 | -229.1 | -746.8 | -489.2 | -225.1 |
| 0 | 1469 | -12 | -62.3 | 41.3 | -16.8 | -179.3 | -729.4 | -504 | -233.6 |
| 0 | 1470 | -12 | -63 | 41 | -15.8 | -132 | -709.5 | -533.7 | -240.5 |
| 0 | 1471 | -12.3 | -65.8 | 42 | -17.3 | -82.2 | -689.7 | -548.5 | -249.1 |
| 0 | 1472 | -11.5 | -65.8 | 43 | -17.3 | -34.9 | -667.4 | -563.3 | -256 |
| 0 | 1473 | -12.8 | -67.8 | 45.3 | -17.5 | 14.9 | -645 | -578.1 | -262.9 |
| 0 | 1474 | -12.5 | -69.3 | 44.8 | -18 | 59.8 | -620.2 | -593 | -269.7 |
| 0 | 1475 | -12.5 | -73 | 47 | -18 | 109.6 | -595.4 | -607.8 | -276.6 |
| 0 | 1476 | -12.8 | -72.5 | 47.5 | -18.5 | 151.9 | -573.1 | -622.6 | -285.2 |
| 0 | 1477 | -11.8 | -76 | 47.5 | -18.3 | 199.2 | -548.3 | -637.4 | -292.1 |
| 0 | 1478 | -12.3 | -76.8 | 48.3 | -17.8 | 244 | -523.5 | -652.3 | -300.7 |
| 0 | 1479 | -13.3 | -78.5 | 50 | -19 | 286.4 | -498.7 | -667.1 | -309.2 |
| 0 | 1480 | -13.3 | -81.3 | 50.3 | -20.3 | 328.7 | -473.9 | -681.9 | -316.1 |
| 0 | 1481 | -13.5 | -80.8 | 51 | -18.8 | 371 | -449 | -696.7 | -324.7 |
| 0 | 1482 | -13.5 | -83 | 52 | -17.8 | 413.4 | -424.2 | -711.6 | -333.3 |
| 0 | 1483 | -13.8 | -84.3 | 53.5 | -19 | 453.2 | -396.9 | -726.4 | -341.9 |
| 0 | 1484 | -13.5 | -85.5 | 53.3 | -19.8 | 490.6 | -369.7 | -726.4 | -352.2 |
| 0 | 1485 | -14.3 | -86.3 | 54.3 | -19.5 | 527.9 | -344.8 | -741.2 | -362.5 |
| 0 | 1486 | -13.8 | -88.3 | 54.8 | -18.8 | 562.8 | -317.6 | -756 | -376.2 |
| 0 | 1487 | -14 | -88.8 | 55.8 | -20.3 | 597.7 | -292.7 | -770.9 | -391.7 |
| 0 | 1488 | -12.8 | -90 | 56.5 | -20.5 | 630 | -265.5 | -785.7 | -412.3 |
| 0 | 1489 | -14 | -90 | 57.5 | -20.5 | 654.9 | -235.7 | -785.7 | -434.7 |
| 0 | 1490 | -13.5 | -92 | 58.5 | -20.8 | 682.3 | -205.9 | -800.5 | -462.1 |
| 0 | 1491 | -13.5 | -92 | 59.3 | -21 | 707.2 | -171.2 | -800.5 | -493.1 |
| 0 | 1492 | -13.3 | -93.5 | 59.8 | -22 | 724.7 | -136.4 | -815.3 | -529.1 |
| 0 | 1493 | -13.3 | -94.5 | 62 | -22.3 | 737.1 | -96.8 | -830.2 | -572.1 |
| 0 | 1494 | -11.8 | -93.8 | 61.5 | -20.8 | 749.6 | -54.6 | -830.2 | -616.8 |
| 0 | 1495 | -13 | -95.5 | 62 | -21 | 757 | -7.4 | -845 | -666.6 |
| 0 | 1496 | -13.8 | -97.3 | 62.5 | -20.5 | 759.5 | 42.2 | -859.8 | -718.1 |
| 0 | 1497 | -13 | -96 | 64.3 | -20.3 | 757 | 91.8 | -859.8 | -774.8 |
| 0 | 1498 | -14.5 | -96.5 | 63.8 | -20.3 | 744.6 | 141.4 | -874.6 | -833.2 |
| 0 | 1499 | -14.5 | -92.5 | 121 | 213.3 | -97.1 | -1927.7 | -10376.9 | -886.5 |
| 0 | 1500 | 221.8 | -121.3 | 48.3 | -76.5 | 328.7 | -947.7 | -1571.4 | -948.3 |
| 0 | 1501 | -102.5 | -48.8 | 41.3 | -3.3 | 704.7 | -528.4 | -563.3 | -1068.6 |
| 0 | 1502 | -33.8 | -52.3 | 24 | -11.3 | 981.2 | -863.4 | -489.2 | -1087.5 |
| 0 | 1503 | -22.3 | -27 | 8.3 | 4.8 | 562.8 | -590.5 | -237.2 | -1108.1 |
| 0 | 1504 | -16.5 | -46.5 | 16 | -2.3 | 169.3 | -302.7 | -474.4 | -1250.7 |
| 0 | 1505 | -17 | -48 | 31.8 | 6.5 | 104.6 | -111.6 | -756 | -1194 |
| 0 | 1506 | -9 | -51 | 41.5 | -4.3 | 271.4 | 69.5 | -593 | -1103 |
| 0 | 1507 | -4 | -36.5 | 35.3 | -5.8 | 306.3 | 287.8 | -474.4 | -994.7 |
| 0 | 1508 | -0.5 | -36.5 | 32.8 | -13.3 | 231.6 | 297.7 | -489.2 | -962.1 |
| 0 | 1509 | -2.8 | -43.5 | 32.5 | -14 | 181.8 | 176.1 | -622.6 | -981 |
| 0 | 1510 | -3.5 | -52.5 | 34.3 | -14 | 264 | 64.5 | -578.1 | -886.5 |
| 0 | 1511 | -6.3 | -53.5 | 29.8 | -16.5 | 405.9 | 76.9 | -415.1 | -757.6 |
| 0 | 1512 | -8.5 | -53 | 31.3 | -16 | 495.6 | 121.6 | -341 | -649.4 |
| 0 | 1513 | -9 | -50.8 | 32.8 | -12.5 | 485.6 | 126.5 | -429.9 | -522.3 |
| 0 | 1514 | -9.5 | -53 | 36.5 | -10.5 | 341.2 | 148.9 | -563.3 | -487.9 |
| 0 | 1515 | -7.3 | -49.8 | 37.5 | -7.8 | 144.4 | 228.2 | -607.8 | -518.8 |
| | 344 | 346 | 376 | 372 | 374 | 370 | 378 | 380 | 382 | 384 |

INSTRUMENTED GOLF CLUB SYSTEM & METHOD OF USE

CROSS REFERENCES TO RELATED APPLICATIONS

The present application is a continuation-in-part application of U.S. patent application Ser. No. 09/310,835, filed on May 12, 1999, now U.S. Pat. No. 6,224,493, which is hereby incorporated by reference in its entirety.

STATEMENT REGARDING FEDERALLY SPONSORED RESEARCH OR DEVELOPMENT

Not Applicable

BACKGROUND OF THE INVENTION

1. Field of the Invention

The present invention relates to golf equipment and, more specifically, to an instrumented golf club system having the ability to make quantitative measurements of specific mechanical or physical properties of the golf club during a golf swing. Data descriptive of the measured properties is stored within a memory device provided in the instrumented golf club.

2. Description of the Related Art

Various data measuring and collecting devices and methods are used for analyzing a golf club during a golf swing. In a similar manner, the effectiveness of a golf ball impact with the golf club during the golf swing can be measured in terms of initial launch conditions. Such launch conditions include the initial velocity, launch angle, spin rate and spin axis of the golf ball. These launch conditions are determined principally by the velocity of a club head at impact and the loft and angle of a club face relative to the intended trajectory of the golf ball's flight. There are two general methods for analyzing the golf club during a golf swing: visual analysis and quantitative variable analysis.

The method of analyzing a golf club during a golf swing using visual analysis typically is conducted by a golf instructor capable of visually discerning golf swing variables, and suggesting corrections in the golfer's swing to provide improvement. However, not every golfer has ready access to professional golf instruction. The golfer also can diagnose certain swing faults using visual analysis methodology employing one or more cameras to record the golfer's swing and comparing it to a model swing. Using various camera angles and slow motion play back, the actual swing motion can be reviewed and altered in subsequent swings.

On the other hand, quantitative variable analysis employs sensors to directly measure various mechanical or physical properties of the golf club during the swing motion. Sensors, such as strain gauges or accelerometers, typically are attached to the shaft or the golf club head. Data collected from these sensors then may be transferred to a signal processor via wires or radio waves, and can be presented in various graphical formats, including graphical and tabular charts. A significant drawback associated with the use of wires in an instrumented golf club is that the wires can be very cumbersome, and can become obtrusive to the golfer when the golfer attempts to swing the golf club. Several different approaches to analyzing a golf club or baseball bat during a baseball or golf swing using quantitative variable analysis are discussed in the patents listed below.

For example, in U.S. Pat. No. 4,759,219, issued to Cobb et al., the specification discloses a baseball bat with a self-contained measuring device and display. A spring potentiometer is used to measure centrifugal force, and an LED or LCD displays the measured force. However, this bat does not contain any data storage capability.

U.S. Pat. No. 5,233,544, issued to Kobayashi, discloses a golf club having multiple sensors, and a cable for transmitting data to a computer for data processing. This arrangement can accommodate up to 5 sensors in a cartridge located in the handle region of the golf club.

U.S. Pat. No. 3,182,508, issued to Varju, discloses the use of a strain gauge in the bottom of a golf club, and a wire for connecting the sensor to a data processing means located separate from the golf club.

U.S. Pat. No. 5,694,340, issued to Kim, discloses the use of multiple sensors for measuring the acceleration of a golf club, and uses either a cable or radio transmissions to transfer data from the sensors to an external data processing means.

U.S. Pat. No. 4,991,850, issued to Wilhelm, discloses the use of a sensor for measuring the applied force of a golf swing. The sensor data can be displayed on a wrist-mounted arrangement or be downloaded to a computer via cable or radio transmission.

U.S. Pat. No. 3,792,863, issued to Evans, discloses the use of multiple sensors, including an accelerometer and strain gauges, to measure torque and flex. Data is transferred from the golf club to a data analysis station via FM radio signals, with each sensor having its own data transfer frequency.

Thus, data transfer to an external memory device is a significant drawback. The cumbersome nature of data transfer via cables or wires affects the motion and feel of a golfer's actual golf swing. In addition, while the use of radio transmissions is preferable to the use of wires or cables emanating from the golf club for transferring data, a transmitter adds excessive weight. The effective range of these wireless instrumented golf clubs is limited by the low power used in such embodiments, and the accuracy of the radio transmitted data is subject to interference or noise from other sources of nearby radio transmissions.

Furthermore, in conventional systems, the receiving equipment typically must be located in close proximity to the radio transmitter disposed in the golf club thereby restricting the flexibility and portability of using such systems. Thus, it is desirable to provide an instrumented golf club that approximates the weight, balance and feel of a golfer's own golf club, in order to ensure that the data collected from the instrumented golf club is applicable to the golfer's actual golf swing. It also may be desirable to provide additional sensors for measuring certain parameters of a golf swing that have previously not been available in instrumented golf clubs. It further may be desirable to provide an efficient means of memory storage within the instrumented golf club to enable internal data capture and storage until the user is ready to download the data for further processing. It further may be desirable to provide data from the instrumented golf club for golf club design.

BRIEF SUMMARY OF THE INVENTION

The instrumented golf club system of the present invention comprises an internally powered and instrumented golf club with multiple sensors to measure, store, and provide an external display of quantitative variables of a golf club during a golf swing. A distinctive feature of the instrumented golf club of the present invention is the use of a data storage memory device located within the instrumented golf club. This eliminates the need to use radio transmission hardware, data cables or wires to transfer data to an external data processing means. This also allows a golfer to swing the instrumented golf club without getting entangled in cables or wires, thus better allowing the golfer to replicate his or her natural golf swing.

In a preferred embodiment, a loop memory device, or ring buffer memory device, is used to continuously store measured data. New data replaces older data in the ring buffer during each successive cycle. The use of a ring buffer memory device is preferable for the creation of an instrumented golf club that is lightweight and free of cables or radio transmitters. Using a linear data capture approach, as taught by the prior art, would require extensive amounts of memory, and would make it very difficult to provide such memory requirements completely internal to an instrumented golf club. It is through the use of the ring buffer memory that one is able to efficiently capture the desired swing data of interest, such as impact with a golf ball, and eliminate the need to provide internal memory to capture data unrelated to a golfer's swings.

Furthermore, since the ring buffer memory captures only the desired swing data of interest, data for multiple swings can be stored in the memory device of the instrumented golf club of the present invention. This provides increased flexibility and mobility to the user since the user is not required to stay within close physical proximity to the external data processing means.

Incorporating an internal power source for the instrumented golf club of the present invention is preferred for providing the benefits of flexibility and mobility. Location of the internal power source also can be used to provide a proper weight balance, or swing weight, for the instrumented golf club, thereby closely approximating the golfer's own golf club. Although the internal power source can be placed in various locations within the instrumented golf club, in a preferred embodiment, a battery tube and one or more batteries are located within the shaft.

Furthermore, the rotation rate about a predefined coordinate system of any desired point on or inside the instrumented golf club can be measured directly by an angular rate sensor. Use of an angular rate sensor provides accurate data for measuring the specific rotation rate of an instrumented golf club. In the prior art, instrumented golf clubs used a combination of sensors to formulate an indirect measurement of rotation rate, which resulted in imprecise measurements. Thus, due to the importance of accurately measuring this particular swing variable, it is desirable to provide a means of capturing accurate angular rotation rate data.

The instrumented golf club system of the present invention further comprises an external data processing means and an interface means to provide communication between the instrumented golf club and the external data processing means, or computing means. Quantitative swing data can be captured, transferred to the processing means, and then presented in any number of graphical, tabular or other visual formats to provide a golfer with meaningful feedback regarding the dynamics of a golf swing.

In addition, the instrumented golf club system of the present invention can be used as a design tool for golf clubs including investigation of such variables as club head geometry, shaft dynamics, structural material behavior and type and location of weighting materials. As an example, the effect of different club head weighting locations can be measured for a wide range of golf swings to provide improved performance within this range of swings.

Accordingly, it is an object of the present invention to provide an instrumented golf club capable of measuring and storing data within the instrumented golf club without the use of an intermediate conduit such as external data transfer cables, wires or radio transmissions, thereby allowing greater flexibility and mobility to a user of the instrumented golf club.

Having briefly described the present invention, the above and further objects, features and advantages thereof will be recognized by those skilled in the pertinent art from the following detailed description of the invention when taken in conjunction with the accompanying drawings.

BRIEF DESCRIPTION OF SEVERAL VIEWS OF THE DRAWINGS

FIG. 2 is a toe perspective view of an instrumented golf club head in accordance with an embodiment of the present invention illustrating a predetermined XYZ coordinate system.

FIG. 2A is an illustration of shaft bending planes of the instrumented golf club in accordance with an embodiment of the present invention.

FIG. 3 is a bottom perspective view of the instrumented golf club head in accordance with an embodiment of the present invention.

FIG. 10 displays sample initial values for all sensors.

FIG. 11 displays sample sensor values during a typical golf swing and ball impact.

DETAILED DESCRIPTION OF THE INVENTION

Figure 1:
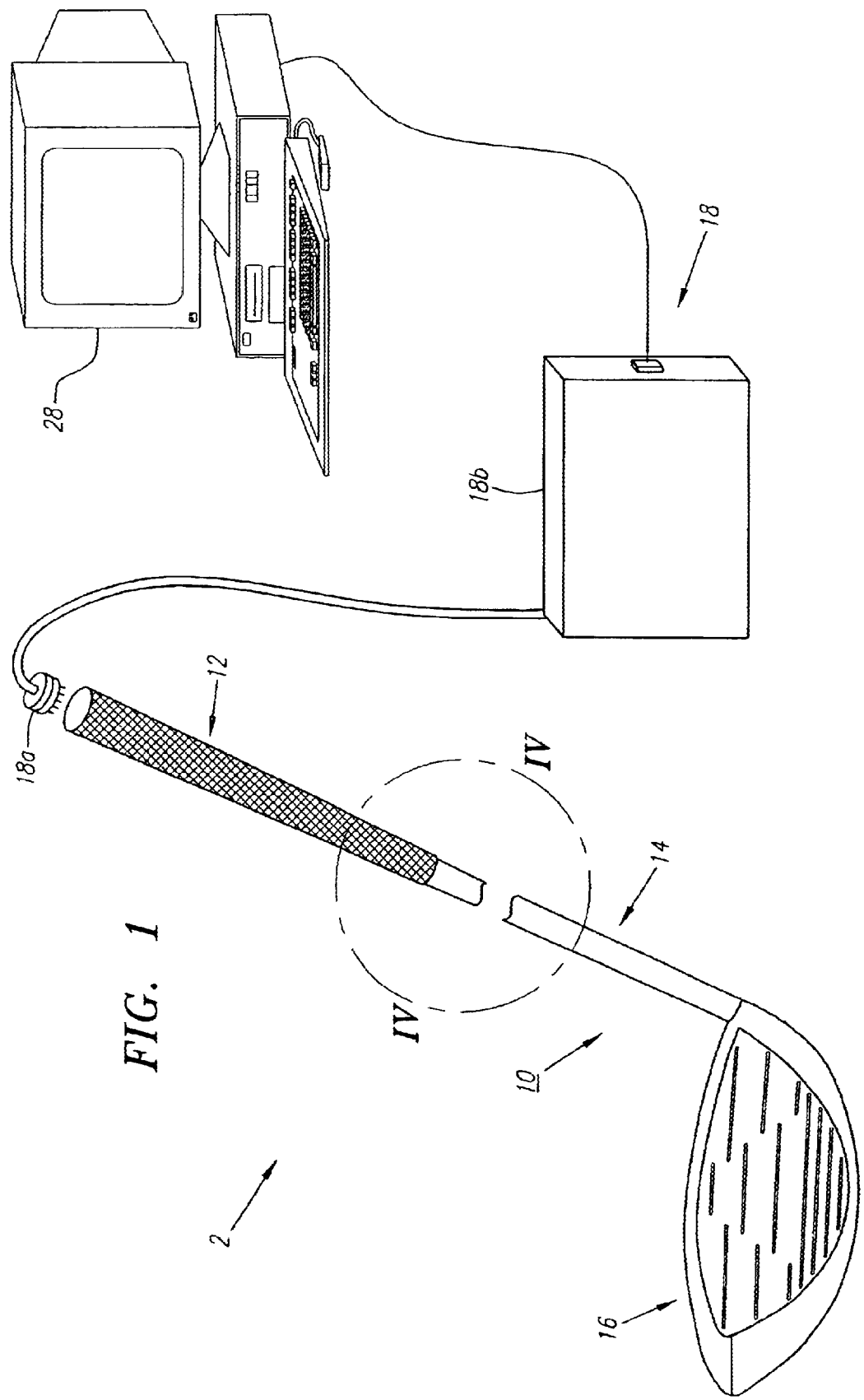
FIG. 1 is a perspective view of an instrumented golf club system in accordance with an embodiment of the present invention comprising an instrumented golf club, an associated interface mechanism and an external computing means.
Figure 4:
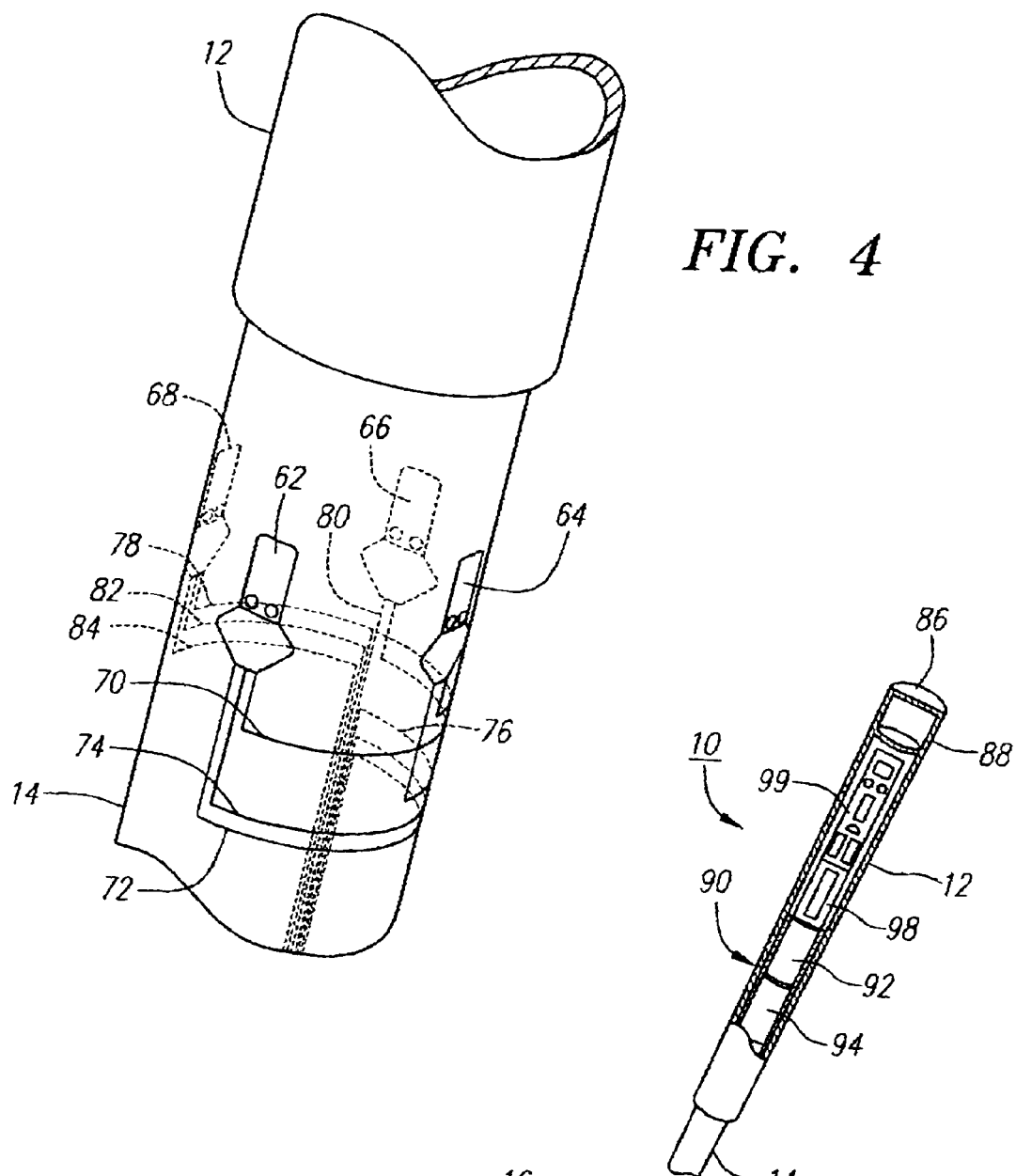
FIG. 4 is a view of a segment of the instrumented golf club, as defined by the area IV—IV in FIG. 1, and shows 2 orthogonally positioned strain gauge sensors on a front surface and 2 orthogonally positioned strain gauge sensors in phantom on a back surface.
Figure 5:
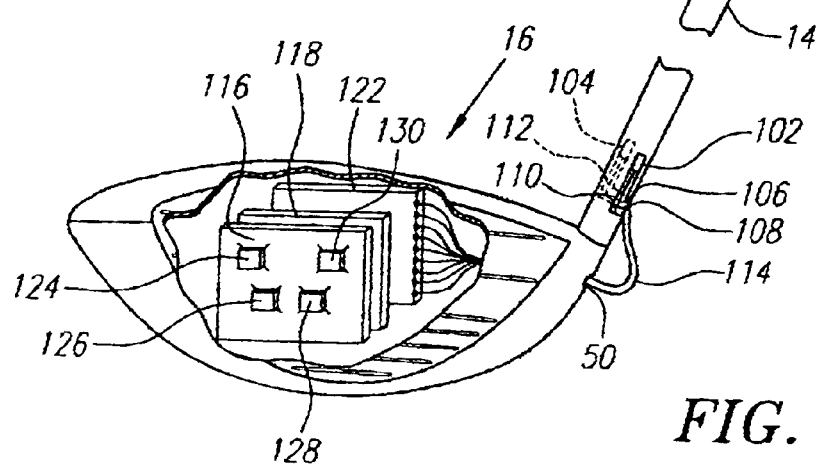
FIG. 5 is a perspective cut-away view of the instrumented golf club in accordance with an embodiment of the present invention showing a plurality of circuit boards in the golf club head, and a cut-away view of the grip region.

FIG. 1 illustrates an instrumented golf club system 2 comprising an instrumented golf club 10, an interface mechanism 18 and a computing or data processing means 28. The instrumented golf club 10 comprises a grip 12, a shaft 14, a club head 16 and a plurality of sensors 62, 64, 66, 68, 98, 102 104, 124, 126, 128 and 130 (as shown in FIGS. 4 and 5) and as further described below. Data measured by the sensors 62, 64, 66, 68, 98, 102, 104, 124, 126, 128 and 130 is transferred from the instrumented golf club 10 to the computing means 28 via the interface mechanism 18.

In a preferred embodiment, the club head 16 is composed of composite material such as disclosed in co-pending U.S. patent application Ser. No. 09/474,927, filed on Dec. 29, 1999, entitled Integral Sole Plate And Hosel For A Golf Club, and which pertinent parts are hereby incorporated by reference. However, those skilled in the pertinent art will recognize that other materials, such as metal, may be used for the club head without departing from the scope and spirit of the present invention. The club head 16 of the present invention is preferably lighter in weight than standard metal club heads to compensate for the weight contribution of the circuitry and electronic elements arranged inside the club head 16. Thus, the club head 16, when combined with the circuitry and electronic elements, should approximate the weight of a standard metal club head.

FIG. 2 is a top perspective view of the club head 16, comprising a top 30, a heel region 32, a face 34, a toe region 36, a rear region 38 and a ribbon 40. A right-hand coordinate system is used, and is illustrated by the designation of the X, Y and Z axes in FIG. 2. The X axis is oriented vertically (at address position) from a soleplate 54 (as shown in FIG. 3) to the top 30 of the club head 16. The Y axis is oriented horizontally (at address position) from the toe region 36 to the heel region 32. The Z axis is oriented horizontally (at address position) from the face 34 to the rear region 38.

FIG. 2A is an illustration showing a first bending plane 49, and a second bending plane 51, wherein, the central axis of the shaft 14 (not shown) defines the intersection line of the first bending plane 49, and the second bending plane 51. The first bending plane 49 is aligned with the face 34 of the club head 16, and the second bending plane 51 is at a 90° angle, or orthogonal, to the first bending plane 49.

As shown in FIG. 3, the club head 16 has an inlet 50 leading to the interior of the club head 16. The soleplate 54 may be secured to the club head 16 via a threaded screw mechanism.

FIG. 4 is a view of a segment of the instrumented golf club, as defined by the area IV—IV in FIG. 1, and shows a first strain gauge 62, a second strain gauge 64, a third strain gauge 66 (in phantom) and a fourth strain gauge 68 (in phantom), all arranged at 90° intervals around the shaft 14. The first strain gauge 62 contains a first wire 70, a second wire 72 and a third wire 74. The second strain gauge 64 contains a fourth wire 76 (in phantom), and a fifth wire 78 (in phantom). The third strain gauge 66 (in phantom), contains a sixth wire 80 (in phantom) and the first wire 70 from the first strain gauge 62. The fourth strain gauge 68 (in phantom), contains a seventh wire 82 (in phantom), an eighth wire 84 (in phantom) and the fifth wire 78 from the second strain gauge 64. The second strain gauge 64, in conjunction with the fourth strain gauge 68, act in unison to measure the flexure of the shaft 14 in the first bending plane 49 (as shown in FIG. 2A). Similarly, the first strain gauge 62, in conjunction with the third strain gauge 66, act in unison to measure the flexure of the shaft 14 in the second bending plane 51, which is orthogonal to the first bending plane 49 (as shown in FIG. 2A).

FIG. 5 is a perspective cut-away view of the instrumented golf club 10, showing a cut-away view of the club head 16 and a cut-away view of the grip 12 region of the shaft 14. The shaft 14 has an opening at a distal end 86. The shaft 14 has a hollow compartment for placement of a power supply therein, electronic circuitry, sensors, and necessary wiring. A cap 88 is used to cover the hollow compartment of the shaft 14. In a preferred embodiment, the power supply is a battery tube 90 contains at least a first battery 92 and a second battery 94. The batteries 92 and 94 provide internal power for the instrumented golf club 10. Preferably, the batteries 92 and 94 are positioned first within the hollow compartment of the shaft 14.

An angular rate sensor 98 is located proximate the battery tube 90, and provides a direct measurement of the rotation rate of the grip area of the shaft 14. In a preferred embodiment, the angular rate sensor 98 is manufactured by Crossbow Technologies, Inc., of San Jose, Calif., model number CGX500M1. Data measured by the angular rate sensor 98 is transmitted to an internal memory device of the electronic circuitry 99 located near the distal end 86 of the shaft 14. The angular rate sensor 98 is preferably juxtaposed by the batteries 92 and 94 and the shaft electronic circuitry board 99.

The shaft electronic circuitry board 99, which may be one or two boards, includes the internal memory device, which is a ring buffer memory 134, a main microprocessor 136, power control circuitry 120, signal conditioning circuitry 121 for the strain gauges in the butt end of the shaft 14, signal conditioning circuitry for the angular rate sensor 98, serial communication circuitry, filter circuitry for the strain gauges and the angular rate sensor 98, and an analog to digital converter circuitry. The shaft electronic circuitry board 99 is a typical power circuitry board.

The ring buffer memory 134 can comprise multiple segments, each acting as an individual ring buffer memory 134. The ring buffer memory 134 records data in a loop configuration. More precisely, data is continually recorded while traversing the loop, and the oldest data will continually be replaced with the newest data. Such data recording is analogous to a clock, where a second hand records and deposits data on its path around the clock face. If the start of data recording is 12 o'clock, and the second hand has made a full circle and returns to 12 o'clock, old data at the 12 o'clock position will be replaced by new data. The power control circuitry 120 includes a voltage distributor 140 to provide proper voltage to all of the circuitry and electronic elements of the instrumented golf club 10.

The signal conditioning circuitry 121 for the strain gauges in the butt end of the shaft includes a first strain gauge circuit 142, a second strain gauge circuit 144 and a third strain gauge circuit 146. The first strain gauge circuit 142 functions as a Wheatstone bridge, and receives signals from the first strain gauge 62 (as shown in FIG. 4) and the third strain gauge 66 (as shown in phantom in FIG. 4). The resultant product from the first strain gauge circuit 142 is a measure of flexure of the shaft 14 in the second bending plane 51, at the location of the first and the third strain gauge 62 and 66. The second strain gauge circuit 144 is another Wheatstone bridge, and functions in a manner similar to the first strain gauge circuit 142, but receives signals from the second strain gauge 64 (as shown in FIG. 4) and the fourth strain gauge 68 (as shown in phantom in FIG. 4). The resultant product from the second strain gauge circuit 144 is a measure of the flexure of the shaft 14 in the first bending plane 49 at the location of the second and the fourth strain gauges 64 and 68.

A fifth strain gauge 102 and a sixth strain gauge 104, located 180° apart on the shaft 14, are shown near the club head 16. The fifth strain gauge 102 contains a ninth wire 106, a tenth wire 108 and an eleventh wire 110. The sixth strain gauge 104 contains a twelfth wire 112 and the ninth wire 106. The ninth wire 106 is common to both the fifth strain gauge 102 and the sixth strain gauge 104. The fifth strain gauge 102, in conjunction with the sixth strain gauge 104, act in unison to measure the flexure of the shaft 14 in the first bending plane 49. The wires 108, 110 and 112 carry signals from the fifth strain gauge 102 and the sixth strain gauge 104 to the strain gauge conditioning board 122 within the club head 16.

A thin layer of a flexible polymer (not illustrated), such as epoxy, is used to bond the wires to the shaft 14 while retaining pliability for flexing of the shaft 14. In a preferred embodiment, the wires from the sensors in the club head 16 of the instrumented golf club 10 are routed along the length of the shaft 14 on a side of the shaft 14 facing a user when the instrumented golf club 10 is at golf ball address position (not shown). This is a preferred location for the routing of the wires on the shaft 14 since this region of the shaft 14 experiences lower stresses than the other regions of the shaft 14, and thus, may eliminate the need to use more expensive flexible wiring circuitry. The wires 108, 110 and 112 are drawn together to form a bundle wire 114 to exit the club head 16 via the inlet 50. The interior of the club head 16 contains an acceleration board 116, a signal conditioning board for the accelerometers 118 and the strain gauge conditioning board 122.

An insulation material may be used to ensure the longevity of the circuitry and electronic elements during repeated impacts with golf balls. In a preferred embodiment, urethane injectable foam (not illustrated) is placed around the inside of the club head 16 to act as a shock absorber. The urethane foam, along with a glass filled epoxy (not illustrated), act as a rigid support between the accelerometer board 116, the signal conditioning board 118, and the strain gauge conditioning board 122.

The accelerometer board 116 preferably contains a first accelerometer 124, a second accelerometer 126, a third accelerometer 128 and a fourth accelerometer 130. The accelerometers 124, 126, 128 and 130 measure acceleration of the club head 16 in the direction of the three principal axes X, Y and Z (as shown in FIG. 2).

Figure 6:
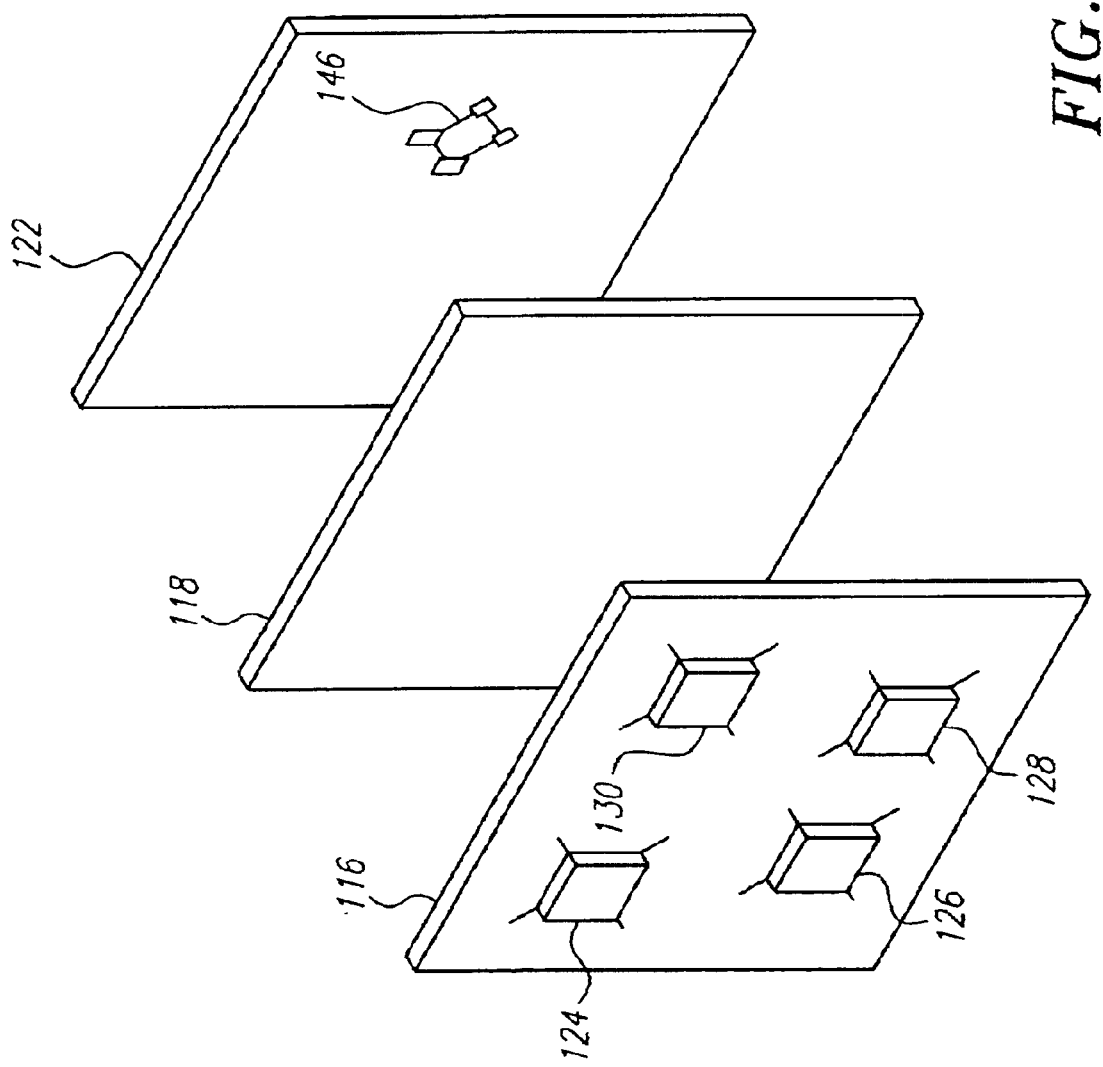
FIG. 6 is an exploded perspective view of the circuit boards of FIG. 5.

As shown in FIG. 6, the accelerometers 124, 126, 128 and 130 are disposed on the accelerometer board 116. The first accelerometer 124 measures the acceleration of the toe region 36 of the club head 16 along the Z axis. The fourth accelerometer 130 measures the acceleration of the heel region 32 of the club head 16 in the Z axis. The second accelerometer 126 and the third accelerometer 128 measure acceleration of the club head 16 in the X and Y axes (as shown in FIG. 2), respectively.

The strain gauge conditioning board 122 has a third strain gauge circuit 146 that also functions as a Wheatstone bridge, but receives signals from the fifth strain gauge 102 (as shown in FIG. 5) and the sixth strain gauge 104 (as shown in phantom in FIG. 5), via the associated wires 108, 110 and 112. The resultant product from the third strain gauge circuit 146 is a measure of the flexure of the shaft 14 in the first bending plane 49, at the location of the fifth and the sixth strain gauges 102 and 104.

The placement of most of the electronics in the shaft 14, as opposed to the club head 16, allows for the use of multiple club heads 16 in order to analyze a golfer's swing for different clubs. Further, the components in the club head 16 are modular, and thus are easily replaceable if damaged. Such replacement is performed via the removable sole plate 54.

The interface mechanism 18 includes a connection plug 18a and a serial interface device 18b. The connection plug preferably has twelve pins for connection to twelve similarly positioned receptors on the shaft electronic board 99. When connected, the interface mechanism provides external power to the instrumented golf club 10 and recharges the batteries 92 and 94. The data that is collected by the instrumented golf club 10 is transferred to the computer means via the interface mechanism 18.

Detailed Description of a Preferred Operation

Figure 7A:
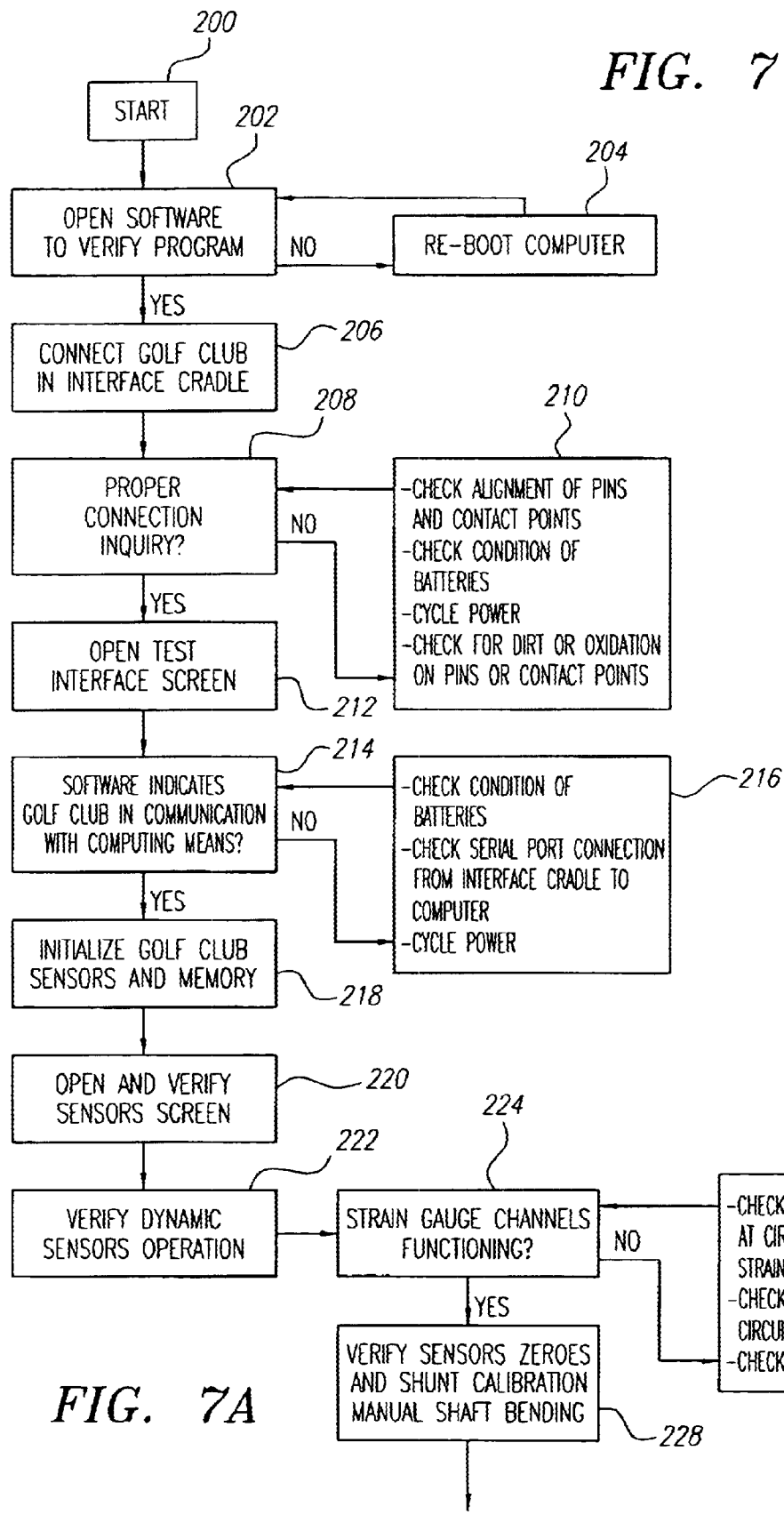
FIGS. 7 (7A, 7B and 7C) shows a flow chart illustrating the operational steps of the instrumented golf club system in accordance with an embodiment of the present invention.
Figure 7:
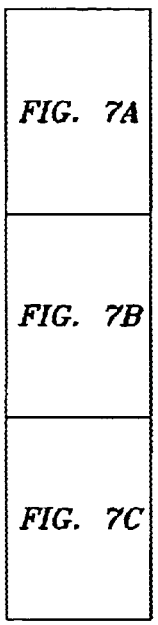

FIG. 7 is a flow chart illustrating the steps of operation of the instrumented golf system (as shown in FIG. 1) of the present invention, starting at step 200. The entire flow chart is shown in three segments, FIGS. 7A, 7B and 7C. A swing analysis software program accessible within the computing or data processing means 28 is opened at step 202 to confirm the ready status of the program. If the program is not responding, at step 204 the program may be re-opened or the computing means 28 may be re-booted.

At step 206, the instrumented golf club 10 is connected to the interface mechanism 18. The twelve pins of the interface connection plug 18a are aligned and inserted into the twelve receptors of the shaft electronic circuitry board 99 within the shaft 14. At step 208, an inquiry is made concerning the proper connection between the club 10 and the interface mechanism 18. If the connection is not proper, various actions can be utilized at step 210 to correct the problem and establish a proper connection.

At step 210, possible solutions include the following: checking the alignment of the pins; checking the condition of the batteries 92 and 94; and checking for and removing dirt or oxidation on pins or receptors.

Figure 8:
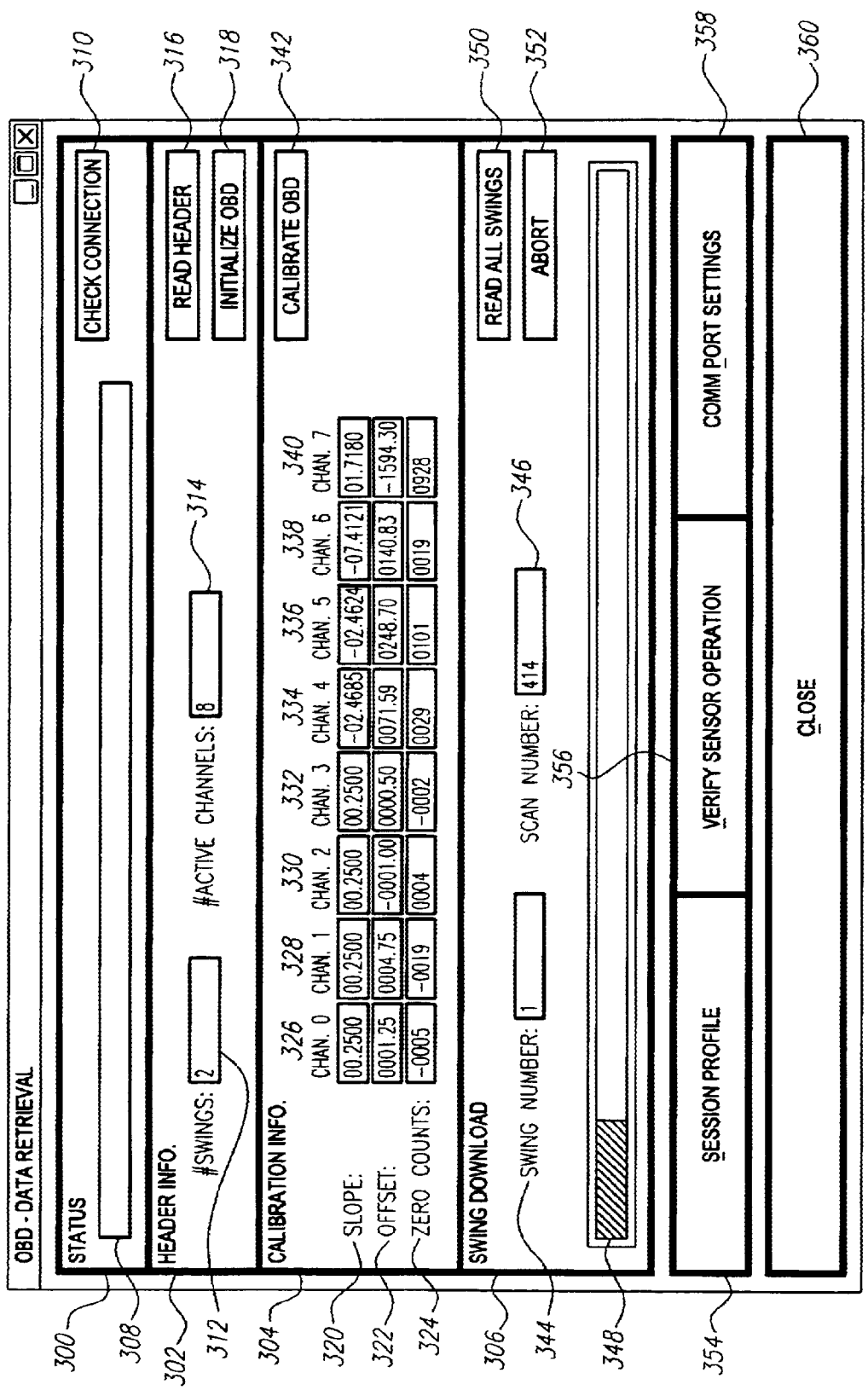
FIG. 8 is a sample test interface screen.

At step 212, a test interface screen (as shown in FIG. 8) is opened to verify that the computing means 28 is in communication with the instrumented golf club 10 at step 214. If no communication is established, at step 216, the following may be performed: checking the batteries 92 and 94; and checking the connection between the interface mechanism 18 and the computing means 28. At step 218, initialization is commenced for the first, second, third, fourth, fifth and sixth strain gauges 62, 64, 66, 68, 102 and 104, respectively, the angular rate sensor 98, and the first, second, third and fourth accelerometers, 124, 126, 128 and 130. At step 218, clearing of the ring buffer memory 134 is also performed.

Figure 9:
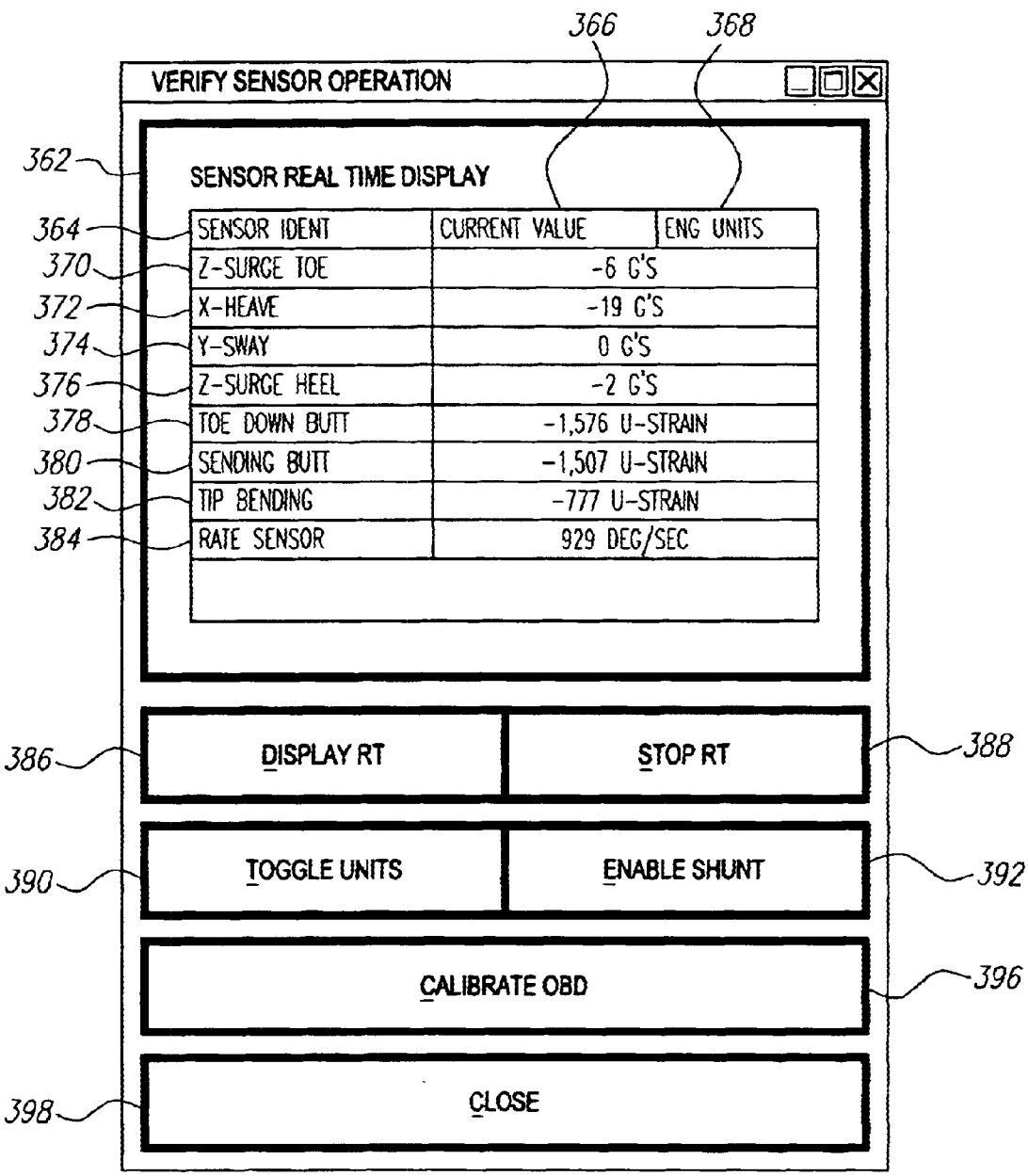
FIG. 9 is a sample sensor screen.

At step 220, the opening and verification of the sensor screen (as shown in FIG. 9) is performed. At step 222, testing of the dynamic operation of the instrumented golf club 10 is performed. At step 224, an inquiry is made concerning the function of the first, second, third, fourth, fifth and sixth strain gauges 62, 64, 66, 68, 102 and 104. At step 226, if the strain gauges are not operating correctly, the following is conducted: checking the wires at the strain gauge conditioning board 122 and the strain gauges; checking the first, second and third strain gauge circuits 142, 144 and 146; and checking the first, second, third, fourth, fifth and sixth strain gauges 62, 64, 66, 68, 102 and 104. At step 228, zeroes and shunt calibration are verified for the first, second, third, fourth, fifth and sixth strain gauges, 62, 64, 66, 68, 102 and 104, respectively, by manually bending the shaft 14 and monitoring data on the verification screen (as shown in FIG. 9).

Figure 7B:
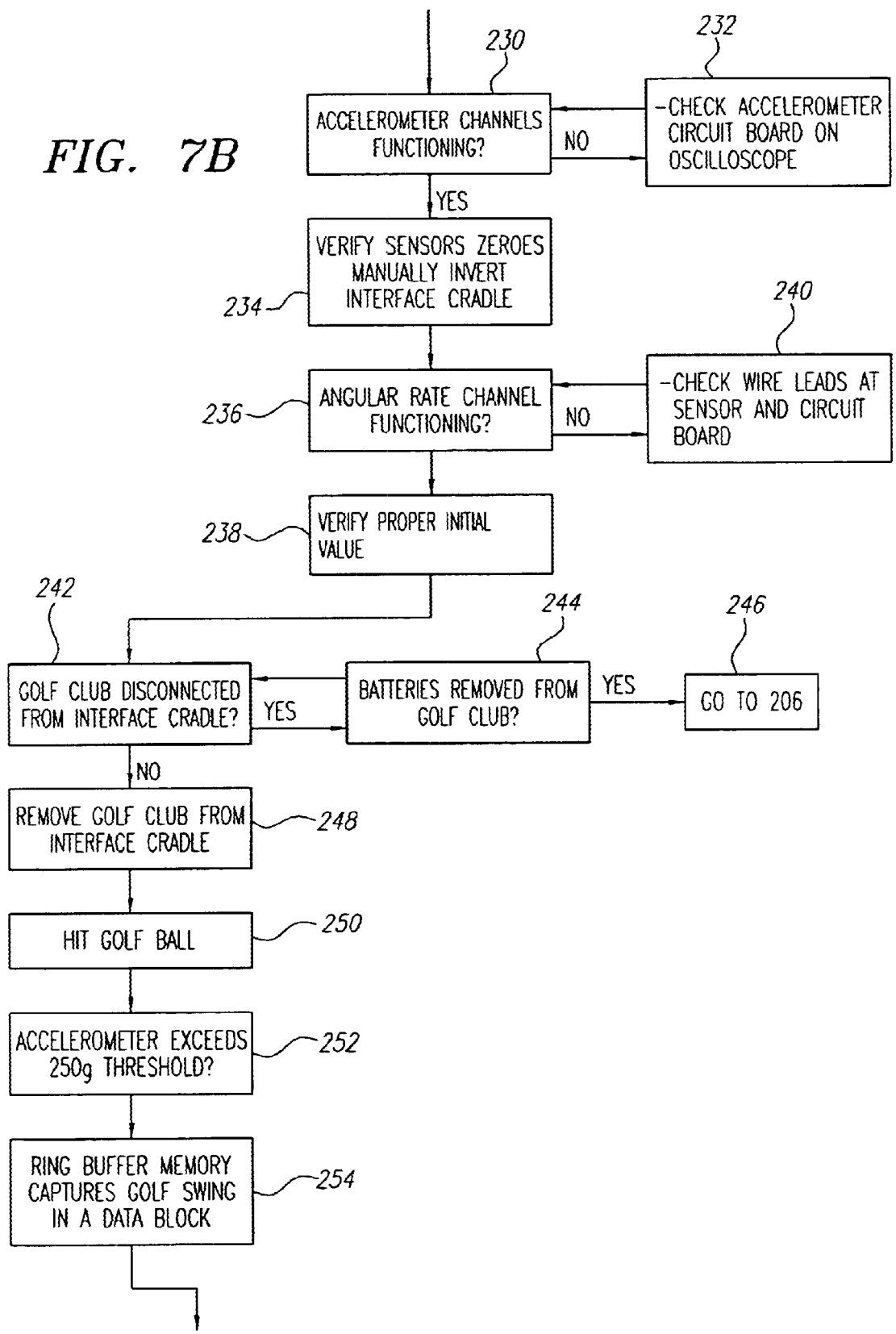

In FIG. 7B, at step 230, operation of first, second, third and fourth accelerometers 124, 126, 128 and 130 is verified. At step 232, if any of the accelerometers are not operating correctly, the accelerometer board 116 is placed on an oscilloscope. At step 234, zeroes for first, second, third and fourth accelerometers 124, 126, 128 and 130, are verified, and values are noted on the sensor screen (as shown in FIG. 9). At step 236, operation of the angular rate sensor 98 is verified. At step 240, if the angular rate sensor 98 is not operating correctly, the angular rate sensor 98 connection to the shaft electronic circuitry board 99 is investigated for proper connection. If the angular rate sensor 98 is operating correctly, then at step 238, the initial value for the angular rate sensor 98 is verified and values are noted on the sensor screen (as shown in FIG. 9).

At step 242, an inquiry is made concerning disconnection of the instrumented golf club 10 from the interface mechanism 18. If the answer to the inquiry is no, then one proceeds to step 248. However, if the answer to the inquiry is yes, then at step 244, an inquiry is made concerning the removal of any of the batteries 92 or 94 from the club 10 for troubleshooting. If the answer to the inquiry is yes, then at step 246 new batteries are inserted and one returns to step 206. If the batteries 92 and 94 have remained within the battery tube 90, and are providing constant power to the instrumented golf club 10, then at step 248 the instrumented golf club 10 is disconnected from the interface mechanism 18.

At this point, the instrumented golf club 10 of the instrumented golf club system 2 switches from external power to internal power supplied by the batteries 92 and 94, and the ring buffer memory 134 starts recording data (as shown in FIG. 10). The instrumented golf club 10 can record data and maintain internal power for approximately 2 hours before it should be reconnected to the interface mechanism 18.

At step 250, the golfer then takes a normal swing to hit a golf ball. At step 252, if the data from the first or fourth accelerometer 124 or 130, respectively, is above a 250 g (acceleration due to gravity) threshold, then at step 254 the ring buffer memory 134 records a data block. This also is referred to as an impact threshold triggering event. In a preferred embodiment of the present invention, the ring buffer memory 134 can record up to eight golf swings and store the corresponding data for these eight golf swings in the data block 150, not shown. The instrumented golf club system 2 may be configured such that the ring buffer memory 134 will not record over the existing data block 150 if the golfer takes more than eight swings.

In a preferred embodiment, the duration of the data block 150 should be sufficient to include a backswing initiation point 152, a backswing phase 154, a downswing phase 156, an impact point 158, and the deceleration of the instrumented golf club 10 in a follow through phase 160, all of which are indicated in FIGS. 11–14. Accordingly, the data block 150 is defined by a pre-impact recording time 162, the impact point 158 and a post-impact recording time 164. Preferably, the pre-impact recording time is approximately 3 seconds, and the post impact recording time is approximately 1 second. More precisely, after impact is detected, the ring buffer memory 134 will preserve data corresponding to the 3 seconds prior to impact and the 1 second following impact. The data collection rate, or scan rate, is a sampling of data every 2 milliseconds. However, it is understood that if more precise data is desired pertaining to the impact point 158, or any other phase of the golfer's swing, the data collection rate can be increased by reducing the time interval between samplings.

Figure 7C:
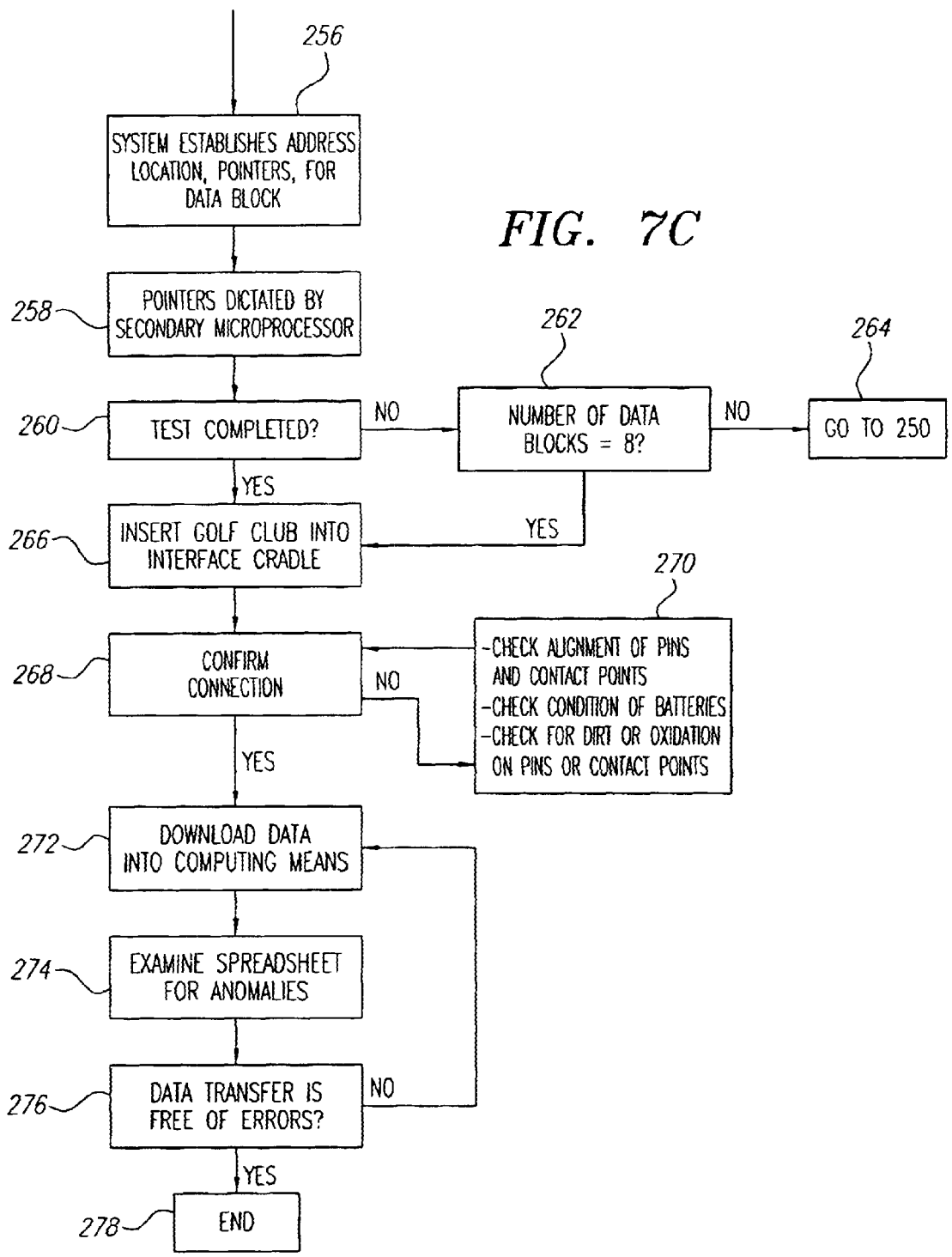

In FIG. 7C, at step 256, the instrumented golf club system 2 establishes a unique address location and pointers for the data block 150. At step 258, pointers are dictated by the secondary microprocessor 138. At step 260, an inquiry is made concerning the completion of the test. If the answer to the inquiry is no, then at step 262 an inquiry is made to ascertain if eight swings have been taken by the golfer. If the answer to this inquiry is no, then at step 264 one returns to step 250. If the answer to this inquiry is yes, or if the test has been completed, one proceeds to step 266. The collection of swing data may be complete at step 260 once the golfer has taken eight swings, or less, if the golfer is satisfied with the number of swings.

At step 266, the instrumented golf club 10 is reconnected to the interface mechanism 18 in order to execute the transfer of the data block 150 to the computing means 28. When the instrumented golf club 10 is reconnected to the interface mechanism 18, external power is supplied to the instrumented golf club 10 and the batteries 92 and 94 are recharged.

At step 268, proper connection between the club 10 and the interface mechanism 18 is confirmed. If the connection is not proper, various actions can be utilized at step 270 to correct the problem and establish a proper connection. Once a proper interface connection is established at step 268, at step 272 the data block 150 is downloaded to the computing means 28. At step 274, an operator of the instrumented golf club system 2 examines all instances of the data block 150 for anomalies. At step 276, an inquiry concerning anomalies results in a return to step 272 if anomalies are present, or proceeding to step 278 if there is an absence of anomalies. At step 278, the sensing, collecting, storing and downloading of swing data is complete. At this point, the collected data is presented in various formats to present useful and informative information to the golfer. It is understood that this raw data can be manipulated to present information to the golfer in a more user friendly manner. For example, instead of showing the golfer a graph of the data relating to the angular rate sensor, software can be developed that will graphically illustrate a golfer and golf club during a swing. This graphical illustration will be a visual representation of the same angular rate for a golf club as that of the recorded data.

The sample interface test screen of FIG. 8 comprises four primary blocks: a Status block 300, a Header Information block 302, a Calibration Information block 304 and a Swing Download block 306. The Status block 300 comprises a Status display 308, to display the condition of the instrumented golf club system 2, and provides a Check Connection button 310 to verify communication between the instrumented golf club 10 and the data processing means 28. The Header Information block 302 comprises a Number of Swings display 312, a display for the Number of Active Channels 314, a Read Header button 316 and an Initialize OBD (On Board Diagnostics) button 318. The "8" appearing in the display for Number of Active Channels 314 represents the number of data streams, which are: the first strain gauge circuit 142; the second strain gauge circuit 144; the third strain gauge circuit 146; the first accelerometer 124; the second accelerometer 126; the third accelerometer 128; the fourth accelerometer 130; and the angular rate sensor 98. The Read Header button 316 displays the number of swings recorded, up to eight in the preferred embodiment, while the Initialize OBD button 318 deletes previously recorded data.

The Calibration Information block 304 includes: a Slope row 320; an Offset row 322 and a Zero Counts row 324; a Channel 0 column 326; a Channel 1 column 328; a Channel 2 column 330; a Channel 3 col. 332; a Channel 4 column 334; a Channel 5 column 336; a Channel 6 column 338; and a Channel 7 column 340. The values in the Slope row 320, the Offset row 322 and the Zero Counts row 324 are used in a linear equation for each of the Channel columns 326, 328, 330, 332, 334, 336, 338 and 340. The linear equation is a conversion from millivolts to engineering units. A Calibrate OBD button 342 is used to toggle between the display using voltage readings or engineering units.

The Swing Download block 306 comprises a Swing Number display 344, and a Scan Number display 346. The Swing Number display 344 notes which golf swing is being downloaded to the computing means 28, and the Scan Number display 346 notes the sequential time line for data collection. A download display bar 348 represents the percentage completion of the download session. A Read All Swings button 350 will download all data to the computing means 28. An Abort button 352 is used to terminate the downloading session. A Session Profile button 354 is used to display all header information associated with a single data download session, such as identification of the instrumented golf club 10, the golfer, the date, the number of swings 312, identification number of the session and related information. A Verify Sensor Operation button 356 will open the verify sensor operation screen of FIG. 9 (as presented below). A Communications Port Settings button 358 is used to change serial port communication settings, such as baud rate and serial port identification, associated with the interface mechanism 18. A Close button 360 is used to exit the interface test screen of FIG. 8.

FIG. 9 illustrates a sample Verify Sensor Operation screen comprising a Sensor Real Time Display box 362, a Sensor Identity column header 364, a Current Value column header 366 and a Units column header 368, currently displaying Engineering Units. A Z-Surge Toe display 370, represents data from the first accelerometer 124; an X-Heave display 372, represents data from the second accelerometer 126; a Y-Sway display 374, represents data from the third accelerometer 128; a Z-Surge Heel display 376, represents data from the fourth accelerometer 130; a Toe Down Butt display 378, represents data from the first strain gauge circuit 142; a Sending Butt display 380, represents data from the second strain gauge circuit 144; a Tip Bending display 382, represents data from the third strain gauge circuit 146; and a Rate Sensor display 384 represents data from the angular rate sensor 98.

A Display RT button 386 is used to provide real time sensor data in the Sensor Real Time Display box 362, and a Stop RT button 388 is used to provide a static display in the Sensor Real Time Display box 362. A Toggle Units button 390 will provide either Direct Voltage readings, or Engineering Units, as shown in the Units header column 368, in the Sensor Real Time Display box 362. An Enable Shunt button 392 provides calibration of the first strain gauge circuit 142, the second strain gauge circuit 144 and the third strain gauge circuit 146.

Calibration is accomplished by placing a known resistor within the desired strain gauge circuit, 142, 144 and/or 146, and verifying the correct display value for the Toe Down Butt display 378, and/or the Sending Butt display 380, and/or the Tip Bending display 382, respectively. A Calibrate OBD button 396 is used to zero: the first accelerometer 124; the second accelerometer 126; the third accelerometer 128; the fourth accelerometer 130; the first strain gauge circuit 142; the second strain gauge circuit 144; the third strain gauge circuit 146; and the angular rate sensor 98. A Close button 398 is used to exit the Verify Sensor Operation screen of FIG. 9.

FIG. 10 comprises sample initial data values when the instrumented golf club 10 is in a ready state, before an actual swing and impact with a golf ball has occurred. The top of FIG. 10 contains the Slope row 320, the Offset row 322 and the Zero Counts row 324 (as shown in FIG. 8). The values in the Slope row 320, the Offset row 322 and the Zero Counts row 324 are used in a linear equation for each of the Channel columns 326, 328, 330, 332, 334, 336, 338 and 340. The linear equation is a conversion from millivolts to engineering units. The Swing Number display 344 notes which golf swing is being downloaded to the computing means 28, and the Scan Number display 346 notes the sequential time line for data collection. A Z Acceleration Heel column 400 is the Z-Surge Heel display 376 (as shown in FIG. 9), and represents data from the fourth accelerometer 130.

An X Acceleration column 402 is the X-Heave display 372 (as shown in FIG. 9), and represents data from the second accelerometer 126. A Y Acceleration column 404 is the Y-Sway display 374 (as shown in FIG. 9), and represents data from the third accelerometer 128. A Z Acceleration Toe column 406 is the Z-Surge Toe display 370 (as shown in FIG. 9), and represents data from the first accelerometer 124. A Butt TD column 408 is the Toe Down Butt display 378 (as shown in FIG. 9), and represents data from the first strain gauge circuit 142. A Butt Bend column 410 is the Sending Butt display 380 (as shown in FIG. 9), and represents data from second strain gauge circuit 144. The Tip Bend display 382 (as shown in FIG. 9) represents data from the third strain gauge circuit 146. An Angular Rate column 412 is the Rate Sensor display 384 (as shown in FIG. 9), and represents data from the angular rate sensor 98.

FIG. 11 is a sample display of data collected from a portion of a typical golf swing, comprising the impact point 158, which is recorded at Scan Number 1500, including data prior to impact from Scan Number 1460 to Scan Number 1499, and data following impact from Scan Number 1501 to Scan Number 1515. At a data collection rate of 2 milliseconds per sampling, FIG. 11, from Scan Number 1460–1515, represents approximately one-tenth of a second in real time data.

The data in the Z Acceleration Heel column 400 is substantially constant prior to, and after, the impact point 158, as the Z axis is perpendicular to the motion of the instrumented golf club 10 during a typical golf swing. However, a large positive, or forward, acceleration occurs at the impact point 158 as the face 34 of the club head 16 rotates through a hitting, or impact, area. The X Acceleration column 402 represents the centripetal component of acceleration, and shows a steady increase up to the impact point 158, a large value at the impact point 158, and constant values thereafter.

The Y Acceleration column 404 represents the acceleration in the Y axis, and is substantially constant before and after the impact point 158, but falls to a minimum near the impact point 158. The Z Acceleration Toe column 406 represents acceleration in the Z axis, at the toe region 36 of the club head 16. The data in the Z Acceleration Toe column 406 closely approximates the trend of the Z Acceleration Heel column 400 data, but contains larger values because of the greater distance from the shaft 14, i.e. during a swing, the toe region 36 moves more quickly about the shaft 14 pivot axis than the heel region 32. The Butt TD column 408 represents data from the first strain gauge circuit 142, in the second bending plane 51. The data increases from negative to positive values, during the downswing, and undergoes a large change at the impact point 158.

The Butt Bend column 410 represents data from the second strain gauge circuit 144, in the first bending plane 49.

The data increases from negative values to positive values, just prior to the impact point 158, while a large negative value is recorded at the impact point 158. The Tip Bend column 382 represents data from the third strain gauge circuit 146, in the first bending plane 49. The data increases in negative values up to the impact point 158, and remains a negative value thereafter. The Angular Rate column 412 represents a rotation rate about the shaft 14, at the location of the angular rate sensor 98, and the rotation rate increases until the instrumented golf club 10 reaches a maximum rotation rate near the impact point 158.

Figure 12:
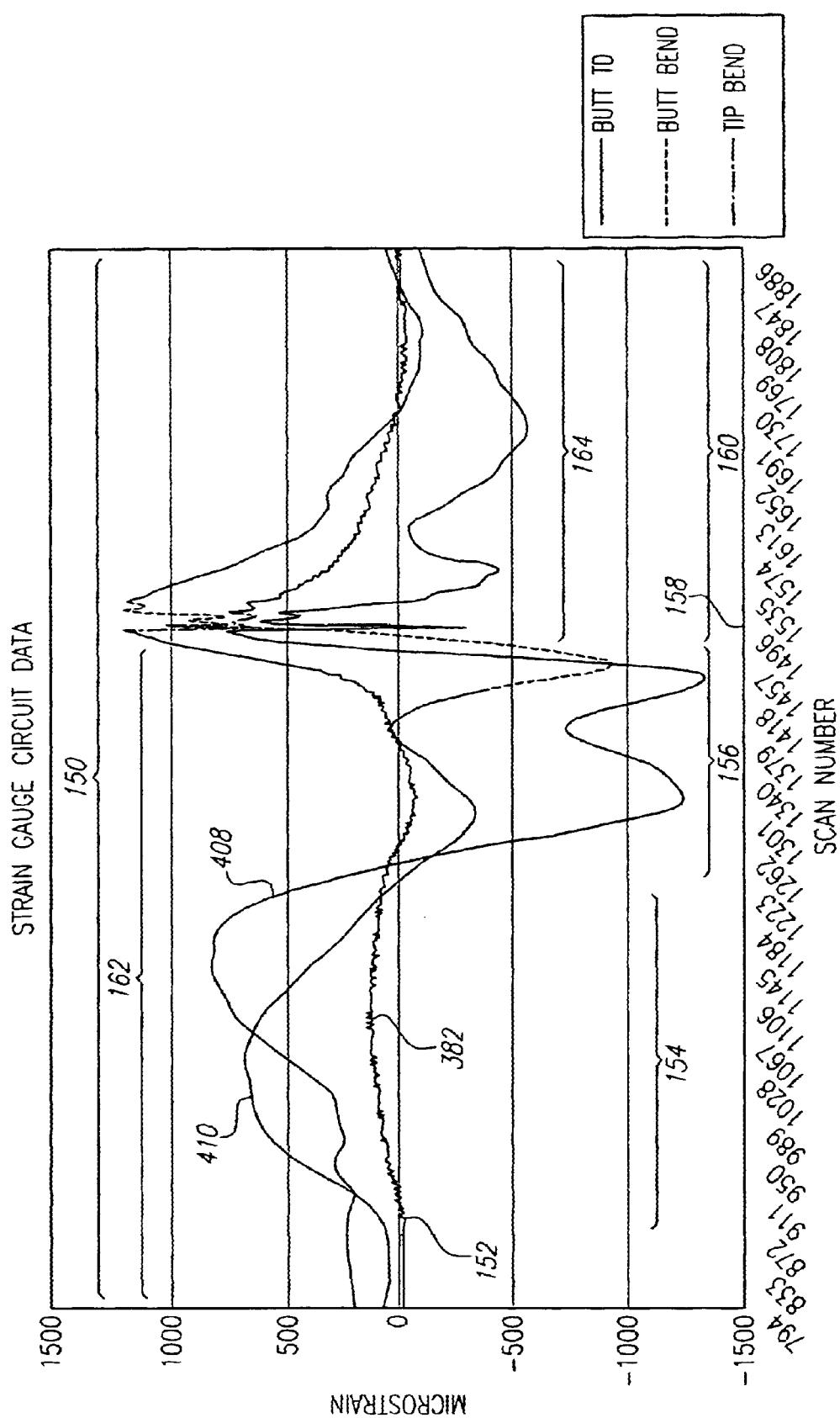
FIG. 12 is a graphical presentation of strain gauge sensor data recorded during a typical golf swing.

FIG. 12 provides a sample graphical presentation of the Strain Gauge Circuit Data from FIG. 11. At the backswing initiation point 152, and into the backswing phase 154, the Butt TD column 408 data and the Butt Bend column 410 data both indicate positive values for the shaft 14. The motion is reversed during the downswing phase 156 of the shaft 14, and the values for the Butt TD column 408, and the Butt Bend column 410 data both indicate negative values. Maximum values for the Tip Bend column 382 data occurs at the impact point 158, which is consistent with the expectation that the tip of the shaft 14 will experience the greatest amount of stress at impact.

Figure 13:
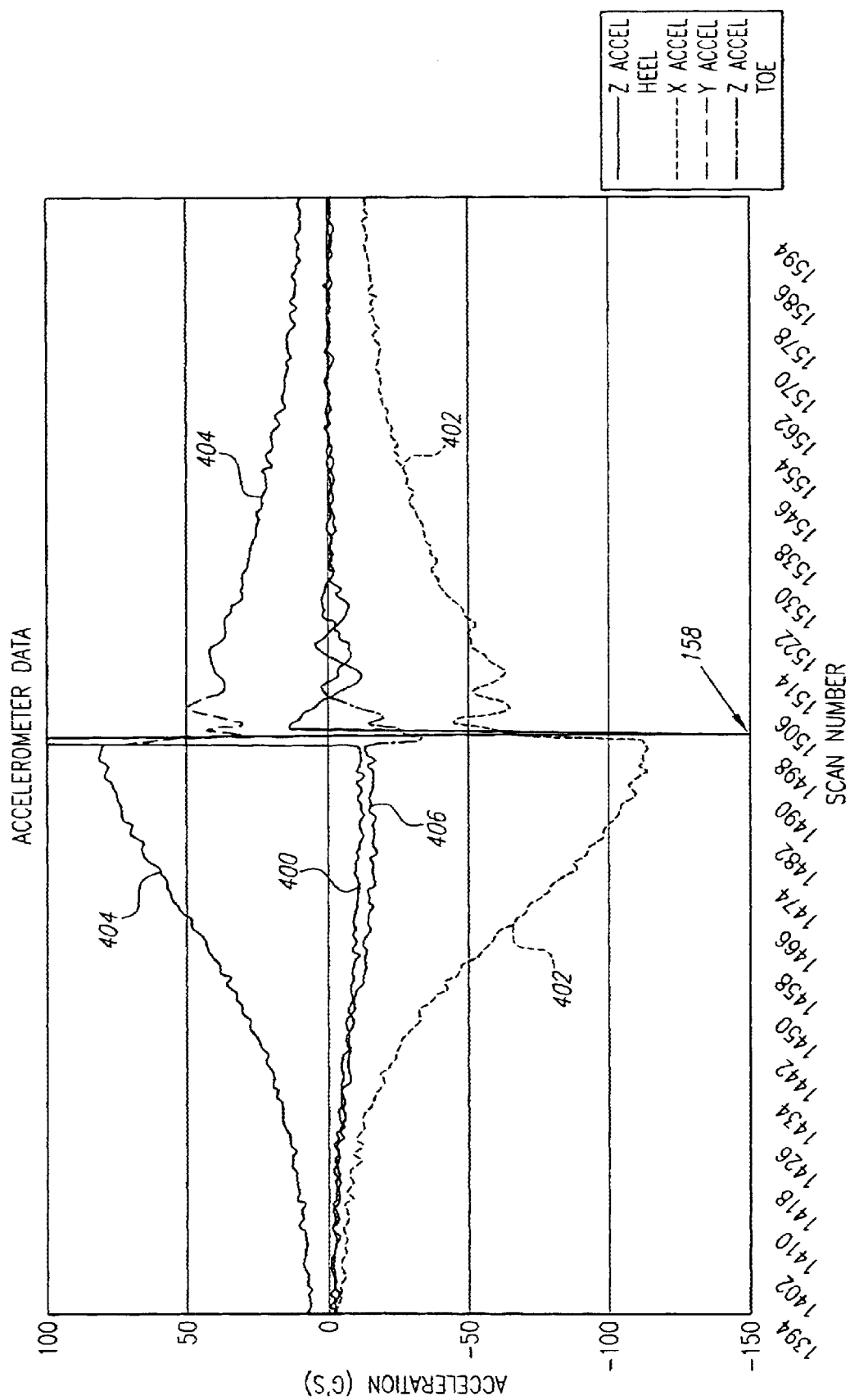
FIG. 13 is a graphical presentation of acceleration sensor data recorded during a typical golf swing.

FIG. 13 provides a sample graphical presentation of the data from the first accelerometer 124, the second accelerometer 126, the third accelerometer 128 and the fourth accelerometer 130. Note that the Z Acceleration Toe column 406 data, and the Z Acceleration Heel column 400 data, are generally parallel prior to the impact point 158, but diverge thereafter. The X Acceleration column 402 and the Y Acceleration column 404 are generally mirror images of one another, both before and after the impact point 158. This represents balanced and escalating acceleration values in the X and Y axis right up to the impact point 158, and indicates an efficient golf swing.

Figure 14:
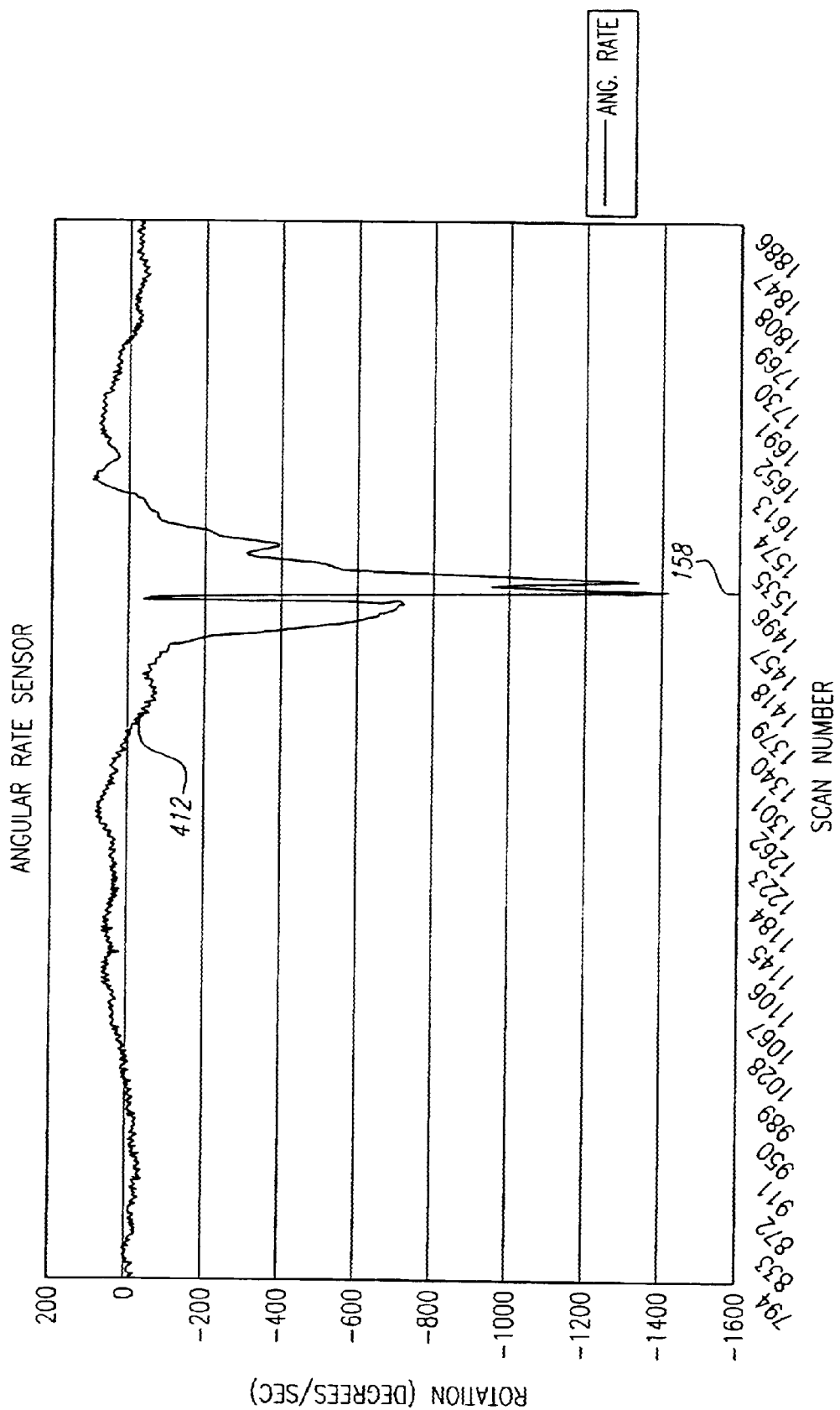
FIG. 14 is a graphical presentation of angular rate sensor data recorded during a typical golf swing.

FIG. 14 provides a sample graphical presentation for the Angular Rate Sensor 98. The Angular Rate column 412 data reaches a maximum near the impact point 158, which is consistent with the expectation that the club face undergoes the greatest change in angular rate as it approaches and leaves the impact area.

Once the raw data is collected, it is understood that a person of ordinary skill in the art of computer programming can create a program that will take the raw data, and manipulate the data such that the characteristics of the golf club during the golfer's swing can be pictorially displayed in a more useful, informative and user friendly manner. A similar procedure can be used in golf club design, for example, to improve the club head geometry, select materials for the club head or shaft, or help locate weighting material within the club head. Furthermore, various tabular, graphical, or other visual formats can be used to display this raw data, including synchronization of the data with a camera for highlighting the golfer's swing area of maximum club head acceleration, hand rotation and shaft bending stress.

In addition, data from an individual golf swing or golf club design can be plotted against golf ball launch data associated with that golf swing or design, so that changes can be suggested to improve distance and accuracy. Cross-plotting of sensor data (i.e. a sensor plotted on the abscissa and a different sensor plotted on the ordinate) can also be used to establish important relationships between two or more mechanical or physical variables, such as acceleration versus angular rate data.

It is understood that the sensors used in the instrumented golf club 10 may take different forms to achieve similar data. For example, an interferometer with fiber optics may be used for measuring acceleration instead of accelerometers. It is also understood that once an instrumented golf club system, such as the preferred embodiment of the instrumented golf club system 2 of the present invention, is disclosed, that a computer programmer of ordinary skill in the art can take this raw data and provide more user-friendly pictorial outputs. For example, by analyzing and processing the raw data on angular rate rotation in association with the acceleration of the heel region and toe region of the golf club head, a program can be created which will allow for the pictorial representation of a computer generated golf club head, as shown just prior to, during and just after the moment of impact with a golf ball. This will provide the golfer with useful feedback beyond just the physically measured numerical data, and will allow the golfer to understand whether or not the golfer is leaving the golf club face open during impact, or whether the golfer is closing the golf club face during impact.

Further, the data may be used to design a golf club that is appropriate for a specific type of golfer, or even for an individual golfer. Various shafts may be utilized in the testing to determine which type of shaft may be appropriate for a specific type of golfer. The shafts may vary in length, thickness, flexibility, and the like. One example would have a golfer swing each type of shaft to determine which one was appropriate for that specific type of golfer. Alternatively, the data may be used to determine an appropriate shaft for a specific type of golfer.

Various club heads also may be utilized in the testing to determine which type of club head may be appropriate for a specific type of golfer. The club heads may vary in material composition, mass, weight placement (e.g. center of gravity purposes), and the like. As above, one example would have a golfer swing each type of club head to determine which one was appropriate for that specific type of golfer. Alternatively, the data may be used to determine an appropriate club head for a specific type of golfer.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention the following:

1. An instrumented golf club system comprising:
    a shaft having a hollow interior, an angular rate sensor disposed within the hollow interior of the shaft, the angular rate sensor capable of measuring data related to the shaft during a golf swing, a power supply disposed within the hollow interior of the shaft, and an electronic circuitry board disposed within the hollow interior of the shaft, the electronic circuitry board having a ring buffer memory circuit, a power control circuit, a signal conditioning circuit for the angular rate sensor, and a serial communication circuit;
    a club head secured to the shaft, the club head having a hollow interior, a plurality of accelerometers disposed within the hollow interior of the club head, and a signal conditioning board for the accelerometers;

a computer for processing the data from the electronic circuit board; and an interface mechanism capable of providing communication between the instrumented golf club and the computer.

2. The instrumented golf club system according to claim 1 further comprising means for connecting the interface mechanism to the electronic circuitry board for transferring data from the electronic circuitry board to the computer.

3. The instrumented golf club system according to claim 1 further comprising a plurality of strain gauges disposed on the butt end of the shaft and a plurality of strain gauges disposed on the tip end of the shaft.

4. The instrumented golf club system according to claim 1 further comprising a signal conditioning board for the plurality of strain gauges disposed on the tip end of the shaft, the signal conditioning board disposed within the hollow interior of the club head, and a signal conditioning circuit on the electronic circuitry board for the plurality of strain gauges disposed on the butt end of the shaft.

5. The instrumented golf club system according to claim 1 wherein the club head is composed of a composite material.

* * * * *